(12) United States Patent
Yamada

(10) Patent No.: US 10,300,732 B2
(45) Date of Patent: May 28, 2019

(54) ANTI-COUNTERFEITING STRUCTURE

(71) Applicant: TOPPAN PRINTING CO., LTD., Tokyo (JP)

(72) Inventor: Shizuka Yamada, Tokyo (JP)

(73) Assignee: TOPPAN PRINTING CO., LTD., Tokyo (JP)

( * ) Notice: Subject to any disclaimer, the term of this patent is extended or adjusted under 35 U.S.C. 154(b) by 0 days.

(21) Appl. No.: 15/919,680

(22) Filed: Mar. 13, 2018

(65) Prior Publication Data

US 2018/0201046 A1 Jul. 19, 2018

Related U.S. Application Data

(63) Continuation of application No. PCT/JP2016/079107, filed on Sep. 30, 2016.

(30) Foreign Application Priority Data

Oct. 2, 2015 (JP) .................................. 2015-197213

(51) Int. Cl.
*B42D 25/23* (2014.01)
*B42D 25/324* (2014.01)
(Continued)

(52) U.S. Cl.
CPC ............ *B42D 25/378* (2014.10); *B23K 26/00* (2013.01); *B23K 26/57* (2015.10); *B32B 5/18* (2013.01);
(Continued)

(58) Field of Classification Search
CPC ....... B42D 25/23; B42D 25/324; B42D 25/41
See application file for complete search history.

(56) References Cited

U.S. PATENT DOCUMENTS 4,507,346 A * 3/1985 Maurer .................. B42D 25/23
283/75
5,801,857 A * 9/1998 Heckenkamp ....... B42D 25/328
283/105
(Continued)

FOREIGN PATENT DOCUMENTS

JP S49-131142 A 12/1974
JP H11-24617 A 1/1999
(Continued)

OTHER PUBLICATIONS

JP2003147297A Translation (Year: 2003).*
(Continued)

*Primary Examiner* — Kyle R Grabowski
(74) *Attorney, Agent, or Firm* — Foley & Lardner LLP

(57) ABSTRACT

The anti-counterfeiting structure includes an allochroic layer including an allochroic part having a characteristic of changing from a first material to a second material in response to laser irradiation, a first layer transmissible to a laser beam, a second layer transmissible to the laser beam, at least a part of the second layer being located between the allochroic layer and the first layer, and a coating layer transmissible to the laser beam and covering at least the first layer. The coating layer and the first layer are bonded together more weakly than the first layer and the second layer are. One of the first layer and the second layer is a foamable layer having a characteristic of changing from an unfoamed state to a foamed state in response to laser irradiation, while the other of the first layer and the second layer is an optical device.

11 Claims, 7 Drawing Sheets

(51) Int. Cl.
| | |
|---|---|
| *B42D 25/41* | (2014.01) |
| *B42D 25/378* | (2014.01) |
| *B23K 26/00* | (2014.01) |
| *B32B 5/18* | (2006.01) |
| *B41M 5/26* | (2006.01) |
| *G02B 5/18* | (2006.01) |
| *G03H 1/02* | (2006.01) |
| *G09F 3/02* | (2006.01) |
| *G09F 3/03* | (2006.01) |
| *B42D 25/36* | (2014.01) |
| *B42D 25/328* | (2014.01) |
| *B23K 26/57* | (2014.01) |
| *B42D 25/47* | (2014.01) |
| *B41M 3/14* | (2006.01) |
| *B41M 5/42* | (2006.01) |
| *B42D 25/373* | (2014.01) |
| *G02B 5/28* | (2006.01) |
| *G02B 5/32* | (2006.01) |

(52) U.S. Cl.
CPC ............... *B41M 3/14* (2013.01); *B41M 5/26* (2013.01); *B41M 5/42* (2013.01); *B42D 25/23* (2014.10); *B42D 25/324* (2014.10); *B42D 25/328* (2014.10); *B42D 25/36* (2014.10); *B42D 25/41* (2014.10); *B42D 25/47* (2014.10); *G02B 5/18* (2013.01); *G03H 1/02* (2013.01); *G09F 3/02* (2013.01); *G09F 3/03* (2013.01); *G09F 3/0376* (2013.01); *B42D 25/373* (2014.10); *G02B 5/285* (2013.01); *G02B 5/32* (2013.01)

(56) References Cited

U.S. PATENT DOCUMENTS

| | | | | |
|---|---|---|---|---|
| 6,082,778 | A * | 7/2000 | Solmsdorf | B42D 25/23 283/107 |
| 7,252,239 | B2 * | 8/2007 | Braun | B42D 25/00 283/109 |
| 2006/0145468 | A1 * | 7/2006 | Plaschka | B42D 25/324 283/72 |
| 2010/0181754 | A1 * | 7/2010 | Labrec | B41M 5/24 283/95 |
| 2011/0204617 | A1 * | 8/2011 | Sugden | B42D 25/00 283/85 |
| 2014/0227487 | A1 * | 8/2014 | Warwick | B42D 25/324 428/159 |

FOREIGN PATENT DOCUMENTS

| | | | |
|---|---|---|---|
| JP | 2003-147297 A | | 5/2003 |
| JP | 2003147297 A | * | 5/2003 |
| JP | 2006-123174 A | | 5/2006 |
| JP | 2009-113269 A | | 5/2009 |
| JP | 2013-188966 A | | 9/2013 |
| JP | 2013188966 A | * | 9/2013 |

OTHER PUBLICATIONS

International Search Report with English translation and Written Opinion issued in International Application No. PCT/JP2016/079107 dated Jan. 10, 2017.

* cited by examiner

ANTI-COUNTERFEITING STRUCTURE

CROSS-REFERENCE TO RELATED PATENT APPLICATIONS

This application is a continuation application filed under 35 U.S.C. § 111(a) claiming the benefit under 35 U.S.C. §§ 120 and 365(c) of International Application No. PCT/JP2016/079107, filed on Sep. 30, 2016, which is based upon and claims the benefit of priority to Japan Priority Application No. 2015-197213, filed on Oct. 2, 2015, the disclosures of which are all hereby incorporated herein by reference in their entireties.

TECHNICAL FILED

The present invention relates to a structure for better preventing of counterfeiting.

BACKGROUND ART

An information authentication medium such as a passport and an identification (ID) card can have an image such as a facial image of an individual to be authenticated in order to enable visual authentication of the individual by use of the information authentication medium. Methods for creating an image on the information authentication medium include laser-irradiating an allochroic layer of the information authentication medium (refer, for example, to PTL 1 and PTL 2).

In addition, an optical variable device (OVD) is attached to the allochroic layer described above for the purpose of preventing the information authentication medium from being counterfeited. Examples of the OVD include a hologram, a diffraction grating, and a multilayer film. Among these, the multilayer film is configured such that light emitted from each film interferes with light emitted from the remaining films. Authenticity determination made by such an optically variable device is used in information authentication media as one means for determining whether or not the information authentication media are authentic.

CITATION LIST

Patent Literature

[PTL 1] JP 1974-131142 A; [PTL 2] JP 2006-123174 A

SUMMARY OF THE INVENTION

Technical Problem

Information authentication media may be possibly counterfeited by an OVD removed from an allochroic layer of an authentic information authentication medium being attached to a fake allochroic layer. It is thus desired to prevent such an information authentication medium from being counterfeited by removal of an OVD from a layer supporting the OVD.

Incidentally, preventing counterfeiting of an anti-counterfeiting structure for an information authentication medium and others is not only desired in an information authentication medium having an OVD, but also in optical devices other than the OVD provided for the purpose of preventing an anti-counterfeiting structure from being counterfeited, typically anti-counterfeiting structures including an optical device that scatters light or an optical device that prevents reflection of light. In addition, preventing counterfeiting of the anti-counterfeiting structure is desired not only in a structure in which an image is formed on an allochroic layer thereof by laser irradiation, but also in a structure in which an image is formed on the layer supporting the OVD by another method such as an ink jet method.

The present invention aims to provide an anti-counterfeiting structure capable of helping to better prevent counterfeiting from being carried out by detachment of an optical device from an anti-counterfeiting structure.

Solution to Problem

An anti-counterfeiting structure for solving the above problem includes an allochroic layer including an allochroic part having a characteristic of changing from a first material to a second material by laser irradiation, a first layer that is transmissible to a laser beam, a second layer that is transmissible to the laser beam, at least a part of the second layer being located between the allochroic layer and the first layer, and a coating layer that is transmissible to the laser beam and that covers at least the first layer. The coating layer and the first layer are bonded together more weakly than the first layer and the second layer are. One of the first layer and the second layer is a foamable layer having a characteristic of changing from an unfoamed state to a foamed state, while the other of the first layer and the second layer is an optical device.

The anti-counterfeiting structure described above makes it possible to record visible information on the allochroic layer by laser irradiation of the allochroic part of the allochroic layer and to foam the foamable layer by laser irradiation of the foamable layer. Removing the optical device from the allochroic layer having predetermined visible information first requires removal of the coating layer from the anti-counterfeiting structure. While the foamable layer and the optical device remain bonded at this time, the state of the foamable layer that has been foamed in the anti-counterfeiting structure is likely to be distorted, due to the stresses of removing the coating layer from the anti-counterfeiting structure. Removing the coating layer from the anti-counterfeiting structure, therefore, leaves, on the structure including the optical device, a trace of the coating layer being removed, which in turn makes it possible to prevent counterfeiting from being carried out by removal of the optical device from the anti-counterfeiting structure.

An anti-counterfeiting structure for helping to solve the above problem includes an information-containing layer that contains visible information, a first layer that is transmissible to a laser beam, a second layer that is transmissible to the laser beam, at least a part of the second layer being located between the information-containing layer and the first layer, and a coating layer that is transmissible to the laser beam and that covers at least the first layer. The coating layer and the first layer are bonded together more weakly than the first layer and the second layer. One of the first layer and the second layer is a foamable layer having a characteristic of changing from an unfoamed state to a foamed state, while the other of the first layer and the second layer is an optical device.

An anti-counterfeiting structure for solving the above problem includes an information-containing layer that contains visible information, a first layer that is transmissible to a laser beam, a second layer that is transmissible to the laser beam, at least a part of the second layer being located between the information-containing layer and the first layer, and a coating layer that is transmissible to the laser beam and that covers at least the first layer. The coating layer and the first layer are bonded together more weakly than the first layer and the second layer. One of the first layer and the second layer is a foamable layer having a characteristic of changing from an unfoamed state to a foamed state and that includes a foamed part, while the other of the first layer and the second layer is an optical device.

The anti-counterfeiting structure described above initially requires removal of the coating layer from the anti-counterfeiting structure during removal of the optical device from the information-containing layer having visible information. While the foamable layer and the optical device maintain their bonding at this time, the state of the foamable layer that has been foamed in the anti-counterfeiting structure is likely to be distorted due to the stresses of removing the coating layer from the anti-counterfeiting structure. Removing the coating layer from the anti-counterfeiting structure, therefore, leaves, on the structure including the optical device, a trace of the coating layer being removed, which in turn makes it possible to prevent counterfeiting from being carried out by removal of the optical device from the anti-counterfeiting structure.

Advantageous Effects of the Invention

The present invention can help to prevent counterfeiting from being carried out by removal of the optical device from the anti-counterfeiting structure.

DESCRIPTION OF THE REPRESENTATIVE EMBODIMENTS

One embodiment of the anti-counterfeiting structure of the present invention will be described with reference to FIGS. 1 to 12. However, it should be understood that the embodiments described below are intended to be representative of the present invention. The present invention is not necessarily limited to the descriptions below. The following sequentially describes the configuration of the anti-counterfeiting structure, a method of laser-irradiating the anti-counterfeiting structure, the mechanism of the anti-counterfeiting structure, a method for manufacturing the anti-counterfeiting structure, and an example.

[The Configuration of the Anti-Counterfeiting Structure]

The configuration of the anti-counterfeiting structure will be described with reference to FIGS. 1 and 2. Note that, in FIG. 1, the thickness of each layer is exaggerated for convenience of illustration.

Figure 1:
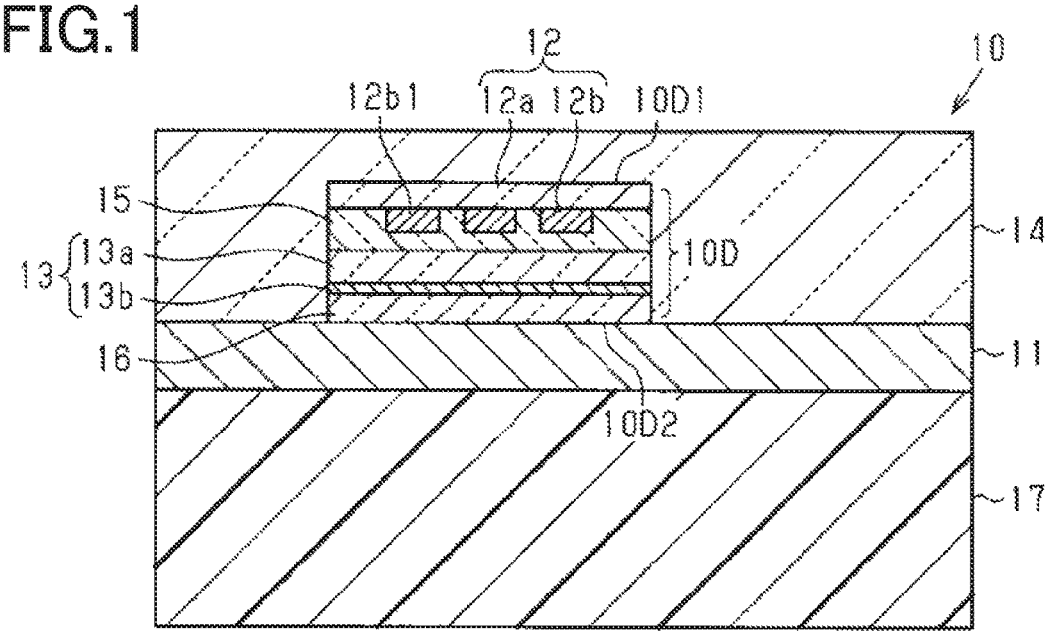
FIG. 1 is a cross-sectional view of an anti-counterfeiting structure, according to one embodiment of an anti-counterfeiting structure of the present invention.

As shown in FIG. 1, an anti-counterfeiting structure 10 includes an allochroic layer 11, a foamable layer 12, which serves as an example of a first layer, an optical device 13, which is located between the allochroic layer 11 and the foamable layer 12 and serves as an example of a second layer, and a coating layer 14 that covers the foamable layer 12.

The allochroic layer 11 is a layer containing an allochroic part that has a characteristic of changing from a first material to a second material in response to laser irradiation, that is, a layer containing an allochroic part that changes its color in response to laser irradiation. The foamable layer 12, the optical device 13, and the coating layer 14 are layers transmissible to a laser beam. The foamable layer 12 is a layer having a characteristic of changing, by laser irradiation, from an unfoamed, or pre-foamed, state to a foamed, or post-foamed, state. In other words, the foamable layer 12 is a layer that foams in response to laser irradiation.

In the anti-counterfeiting structure 10, the coating layer 14 and the foamable layer 12 are bonded together more weakly than the foamable layer 12 and the optical device 13 are.

Such an anti-counterfeiting structure 10 makes it possible to record visible information on the allochroic layer 11 by laser irradiation of the allochroic part of the allochroic layer 11 and to cause the foamable layer 12 to foam by laser irradiation of the foamable layer 12.

Removing the optical device 13 from the allochroic layer 11 having predetermined visible information first requires removal of the coating layer 14 from the anti-counterfeiting structure 10. While the foamable layer 12 and the optical device 13 maintain their bonding at this time, the state of the foamable layer that has been foamed in the anti-counterfeiting structure 10 is likely to be distorted by the stresses of removing the coating layer 14 from the anti-counterfeiting structure 10. Removing the coating layer 14 from the anti-counterfeiting structure 10, therefore, leaves, on the structure including the optical device 13, a trace of the coating layer 14 being removed, which in turn makes it possible to prevent counterfeiting from being carried out by removal of the optical device 13 from the anti-counterfeiting structure 10.

In the anti-counterfeiting structure 10 described above, the first layer is the foamable layer 12 and the second layer is the optical device 13. This configuration allows the optical device 13 to consume less laser beam energy during laser irradiation from the coating layer 14 toward the foamable layer 12 than a configuration in which the foamable layer 12 is sandwiched between the optical device 13 and the coating layer 14. As a result, the anti-counterfeiting structure 10 can be irradiated with less laser beam energy.

The foamable layer 12 includes a foamable member 12a and a foam-promoting portion 12b. The foam-promoting portion 12b has a part that overlaps with a part of the foamable member 12a in a plan view of the coating layer 14. The foam-promoting portion 12b has a characteristic of promoting foaming in the part of the foamable member 12a by laser irradiation. This makes it possible to selectively cause foaming in the part of the foamable member 12a overlapping with the foam-promoting portion 12b.

The foam-promoting portion 12b is constituted by a plurality of promoting members 12b1, each being located between the optical device 13 and the foamable member 12a in a thickness direction of the anti-counterfeiting structure 10. Each promoting member 12b1 is located away from the other remaining promoting members 12b1 in the plan view of the coating layer 14.

The anti-counterfeiting structure 10 further includes an intermediate layer 15. The intermediate layer 15 is located between the optical device 13 and the foamable layer 12 in the thickness direction of the anti-counterfeiting structure 10, and fills each gap between the promoting members 12b1 in the plan view of the coating layer 14. The configuration in which the intermediate layer 15 fills the gap between the promoting members 12b1 enhances flatness on a surface in contact with the optical device 13, so that optical characteristics of the optical device 13 will vary less within a plane parallel to the coating layer 14.

Preferably, the optical device 13 is, for example, an optically variable device (OVD) and is configured to have a fine uneven structure. The optical device 13 includes a forming part 13a for forming the uneven structure of the optical device 13 and an amplifying part 13b for amplifying an optical effect of the optical device 13. Note that the OVD is an optical device that reproduces a different image for each direction in which the OVD is visually recognized.

The optical device 13 is a diffraction grating, a hologram, or the like. The optical device 13 may be a multilayer film constituted by three or more layers. When the optical device 13 is a multilayer film, the optical device 13 may optionally not include the forming part 13a and the amplifying part 13b but may be only formed of a plurality of films each having a different refractive index.

The anti-counterfeiting structure 10 further includes an adhesive layer 16 for adhering the optical device 13 to the allochroic layer 11 and a base material 17 for supporting the allochroic layer 11. The adhesive layer 16 is transmissible to a laser beam.

Constituted by the foamable layer 12, the intermediate layer 15, the optical device 13, and the adhesive layer 16 in the anti-counterfeiting structure 10 is a device structure 10D. The device structure 10D has a first surface 10D1 and a second surface 10D2, which is a surface opposite to the first surface 10D1. The first surface 10D1 is one surface of the foamable layer 12, and the second surface 10D2 is one surface of the adhesive layer 16.

The first surface 10D1 and the coating layer 14 are bonded together more weakly than the second surface 10D2 and the allochroic layer 11, and more weakly in the device structure 10D than mutually adjacent layers are bonded.

Note that, even if the first surface 10D1 and the coating layer 14 are bonded more strongly than the second surface 10D2 and the allochroic layer 11 are, the device structure 10D removed from the allochroic layer 11 still needs to be adhered to a fake allochroic layer 11. Reproducing a state in a fake anti-counterfeiting structure in which the device structure 10D is sandwiched between the allochroic layer 11 and the coating layer 14 in a real anti-counterfeiting structure, requires the coating layer 14 to be removed from the device structure 10D and the removed device structure 10D to be sandwiched again by the fake coating layer 14 and the fake allochroic layer 11. Even in a circumstance where the allochroic layer 11 and the device structure 10D are separated from each other, stress arising at the time of removal of the coating layer 14 from the device structure 10D as well as a stress arising at the time of removal of the coating layer 14 from the allochroic layer 11 act on the foamable layer 12, which makes it possible to hinder counterfeiting of the anti-counterfeiting structure 10 by removal of the optical device 13 from the anti-counterfeiting structure 10.

In the device structure 10D, the foamable layer 12 and the optical device 13, more specifically, the foamable layer 12 and the intermediate layer 15, and the intermediate layer 15 and the optical device 13, are preferably bonded more strongly than the internal cohesive failure strength of the optical device 13. Such a configuration makes it impossible to separate the optical device 13 and the foamable layer 12 from each other without destroying the optical device 13 during an attempt to remove the foamable layer 12 from the optical device 13.

Note that the foamable layer 12 and the optical device 13 may be bonded together as strongly as or more weakly than the internal cohesive failure strength of the optical device 13. In such a configuration, a certain degree of stress still acts on the foamable layer 12 and the optical device 13 during removal of the foamable layer 12 from the optical device 13. It is thus a matter of course that the action of stress changes the foaming state in the foamable layer 12, and at least a part of the optical device 13 deforms to an extent of being unable to perform its inherent function thereof. This can prevent counterfeiting from being carried out by removal of the optical device 13 from the anti-counterfeiting structure 10.

Figure 2:
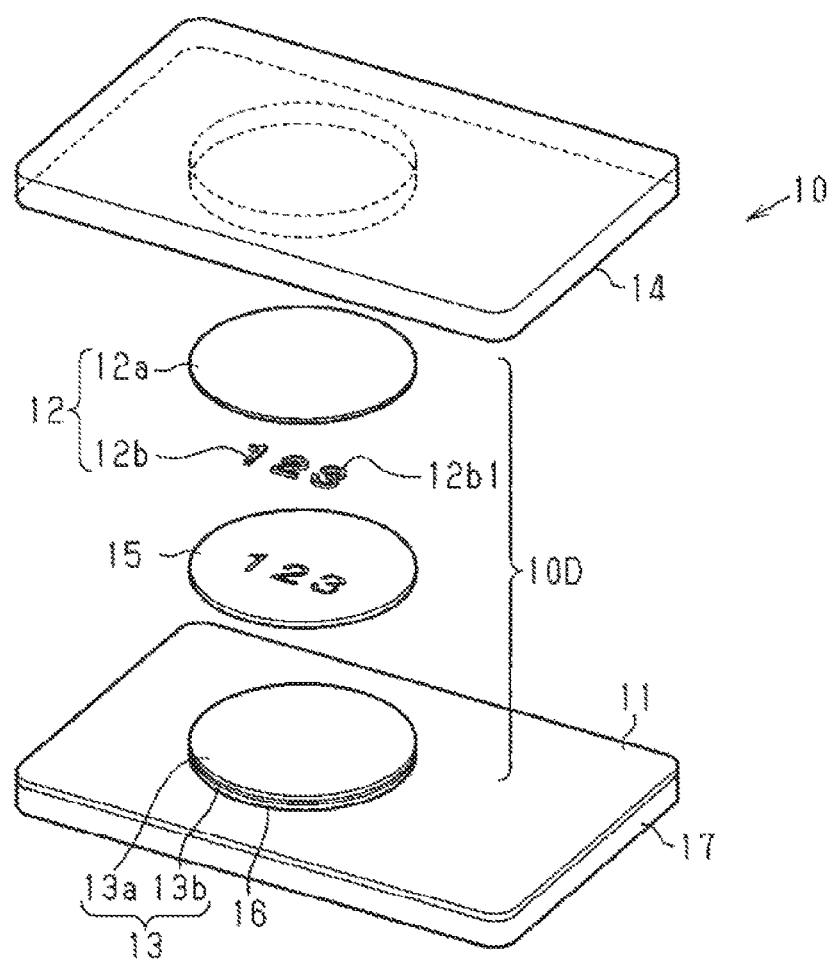
FIG. 2 is an exploded perspective view of the anti-counterfeiting structure which has not been laser-irradiated, with the structure disassembled into layers constituting it.

As shown in FIG. 2, the foamable layer 12 overlaps with a part of the allochroic layer 11 in the plan view of the coating layer 14. A whole of the allochroic layer 11 opposed to the coating layer 14 in a plan view is an allochroic part. In other words, the foamable layer 12 has a part that overlaps with a part of the allochroic part in the plan view of the coating layer 14.

In a circumstance where the foamable layer 12 and the allochroic part overlap with each other in the plan view of the coating layer 14, foaming in a part of the foamable layer 12 and discoloration in a part overlapping with the part of the foamable layer 12 in the plan view of the coating layer 14 in the allochroic part can be also carried out by one occasion of laser irradiation for the purpose of discoloration.

In other words, when the foamable layer 12 includes the foam-promoting portion 12b as described above, the laser irradiation may be carried out such that energy reaches the foam-promoting portion 12b and a part overlapping with the foam-promoting portion 12b in the plan view of the coating layer 14. Foaming in the foamable layer 12 and discoloration in the allochroic layer 11 can be thereby carried out almost simultaneously.

In the plan view of the coating layer 14, the plurality of promoting members 12b1 are located on the allochroic layer 11 so as to indicate predetermined visible information. In the plan view of the coating layer 14, a part of the coating layer 14 overlapping with each promoting member 12b1 is configured to have a characteristic of changing its unfoamed state to the foamed state by laser irradiation to each promoting member 12b1. In other words, the part of the coating layer 14 overlapping with each promoting member 12b1 is configured to foam by the laser irradiation to each promoting member 12b1.

When a side opposite to the allochroic layer 11 relative to the coating layer 14 is an observation side of the anti-counterfeiting structure 10, visible information formed by the plurality of promotion parts 12b1 is recognized by an observer. The anti-counterfeiting structure 10 can thus contain visible information indicated by the allochroic part of the allochroic layer 11 and visible information indicated by the foamed part of the cover layer 14.

The visual information indicated by the plurality of promotion parts 12b1 is a plurality of numbers consisting of numerals "1", "2", and "3". Note that the visible information may consist of letters, symbols, and figures in addition to numbers, or may consist of at least two of numbers, letters, symbols, and figures.

In the plan view of the coating layer 14, the device structure 10D overlaps with a part of the allochroic layer 11, but may overlap with the whole of the allochroic layer 11.

In other words, in the plan view of the coating layer 14, the optical device 13 included in the device structure 10D may extend on the whole of the allochroic layer 11, or the foaming layer 12 may extend on the whole of the allochroic layer 11.

[Method of Laser Irradiation]

A method of laser-irradiating the anti-counterfeiting structure 10 will be described with reference to FIGS. 3 to 6. In the following description, by way of example, a method of applying a laser beam for forming a predetermined part in the foamable layer 12 of the anti-counterfeiting structure 10 will be described first, followed by applying a laser beam for recording visible information on the allochroic layer 11 thereof. In FIGS. 4 and 6, a part of the anti-counterfeiting structure 10 where the optical device 13 is located is dotted for schematic illustration of an image of the optical device 13 to be recognized by transmission through the coating layer 14 in the plan view of the coating layer 14.

During laser irradiation of the anti-counterfeiting structure 10, however, irradiation for recording visible information on the allochroic layer 11 may be carried out before irradiation for foaming the foamable layer 12. Alternatively, the irradiation recording visible information on the allochroic layer 11 and the irradiation for causing the foamable layer 12 to foam may be carried out almost simultaneously.

The following description contains an example in which irradiation of the anti-counterfeiting structure 10 is performed with respect to the coating layer 14 from a side opposite to the base material 17, but the anti-counterfeiting structure 10 may be laser-irradiated from a side opposite to the coating layer 14 relative to the base material 17.

Figure 3:
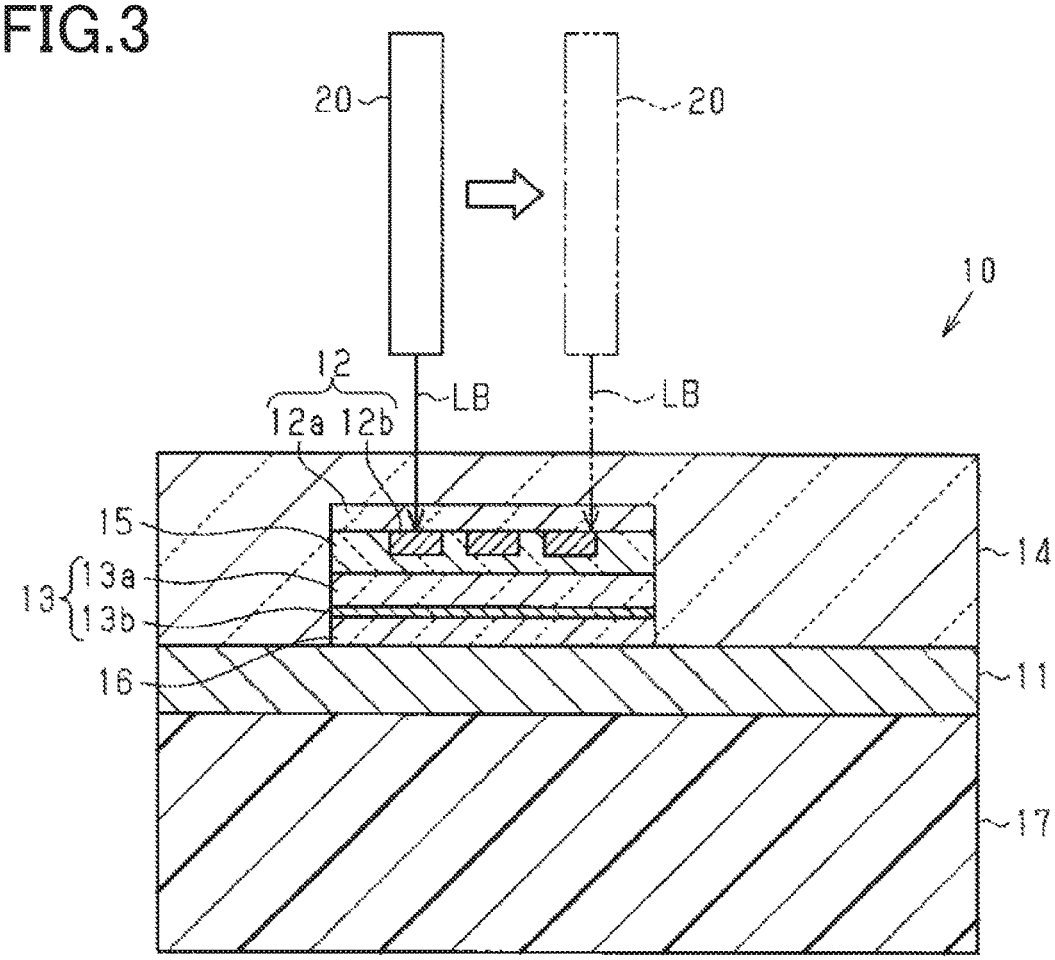
FIG. 3 illustrates a process of laser-irradiating the anti-counterfeiting structure to foam a foamable layer.
Figure 4:
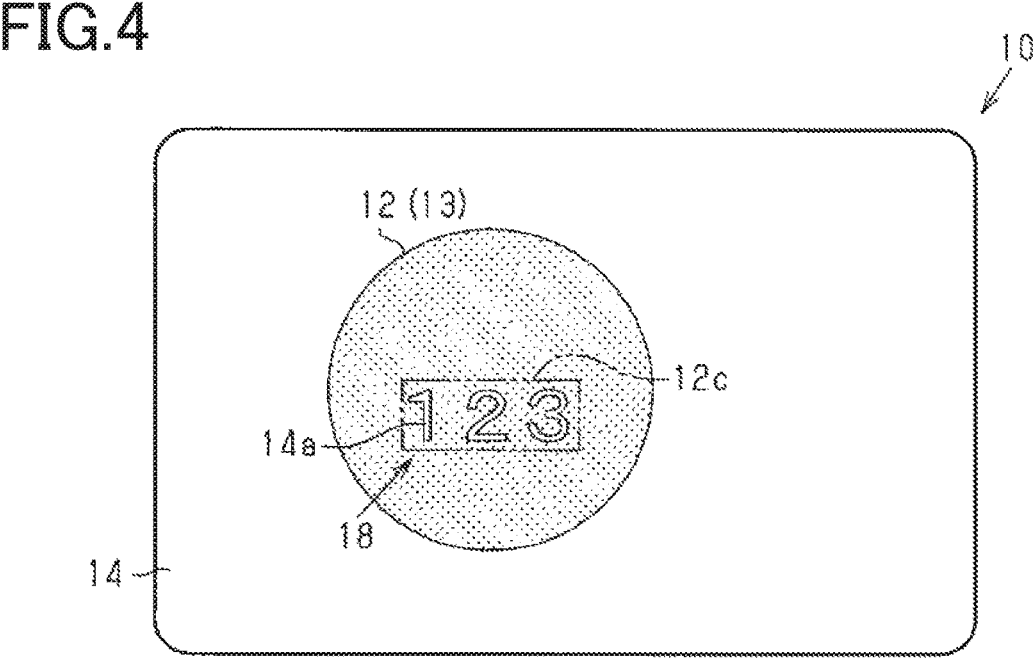
FIG. 4 is a plan view of the anti-counterfeiting structure that has been subjected to the laser irradiation for foaming the foamable layer.

As shown in FIG. 3, during laser irradiation to the anti-counterfeiting structure 10, the anti-counterfeiting structure 10 is first laser-irradiated LB in order to foam a predetermined part of the foamable layer 12. At this time, the foam-promoting portion 12b, of the anti-counterfeiting structure 10, included in the predetermined part and a part around the foam-promoting portion 12b thereof in the plan view of the coating layer 14 are irradiated with the laser beam LB by use of a laser 20.

Energy of the laser beam LB emitted by the laser 20 is set to a level at which the part of the foamable member 12a that overlaps with the foam-promoting portion 12b can foam in the plan view of the coating layer 14. In other words, the energy of the laser beam LB is set to a level at which energy that is large enough to change an unfoamed part of the foamable member 12a to a foamed state reaches the foam-promoting portion 12b. In addition, the energy of the laser beam LB and a position of a focal point thereof are set so that energy that is large enough to discolor the allochroic layer 11 will not reach the allochroic layer 11.

This helps to prevent the allochroic layer 11 from discoloring even if the foam-promoting portion 12b, of the anti-counterfeiting structure 10, which is included in the predetermined part and the part around the foam-promoting portion 12b in the plan view of the coating layer 14 are irradiated with the laser beam LB.

On the other hand, in the anti-counterfeiting structure 10, compared with an occasion when only the part where the foam-promoting portion 12b is located in the plan view of the coating layer 14 is irradiated with the laser beam LB, the whole of the part of the foamable member 12a overlapping with the foam-promoting portion 12b easily foams in the plan view of the coating layer 14.

As shown in FIG. 4, in a plan view of the coating layer 14, the irradiated part 12c including the part where the foam-promoting portion 12b is located and the part around the foam-promoting portion 12b are irradiated with the laser beam LB to cause the foamable layer 12 to foam.

This foams the part of the foamable member 12a overlapping with the foam-promoting portion 12b in the plan view of the coating layer 14 and the part of the coating layer 14 overlapping with the foam-promoting portion 12b in the plan view of the coating layer 14.

As a result, a foamed part is formed in the part of the foamable layer 12 overlapping with the foam-promoting portion 12b in the plan view of the coating layer 14 and a foamed part 14a is formed in the part of the coating layer 14 overlapping with the foam-promoting portion 12b in the plan view of the coating layer 14. The foamed part 14a shows visible information 18 on the observation side of the anti-counterfeiting structure 10.

Figure 5:
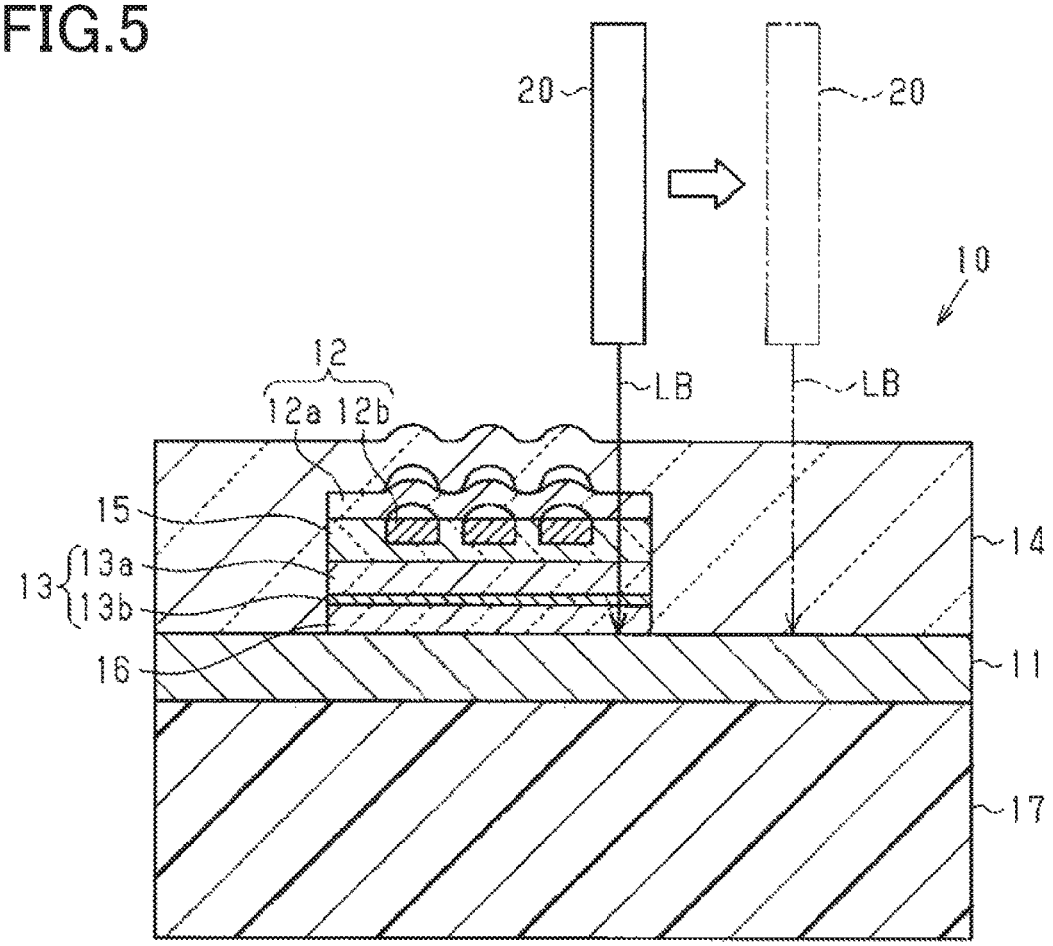
FIG. 5 illustrates a process of laser-irradiating the anti-counterfeiting structure to record visible information on an allochroic layer.
Figure 6:
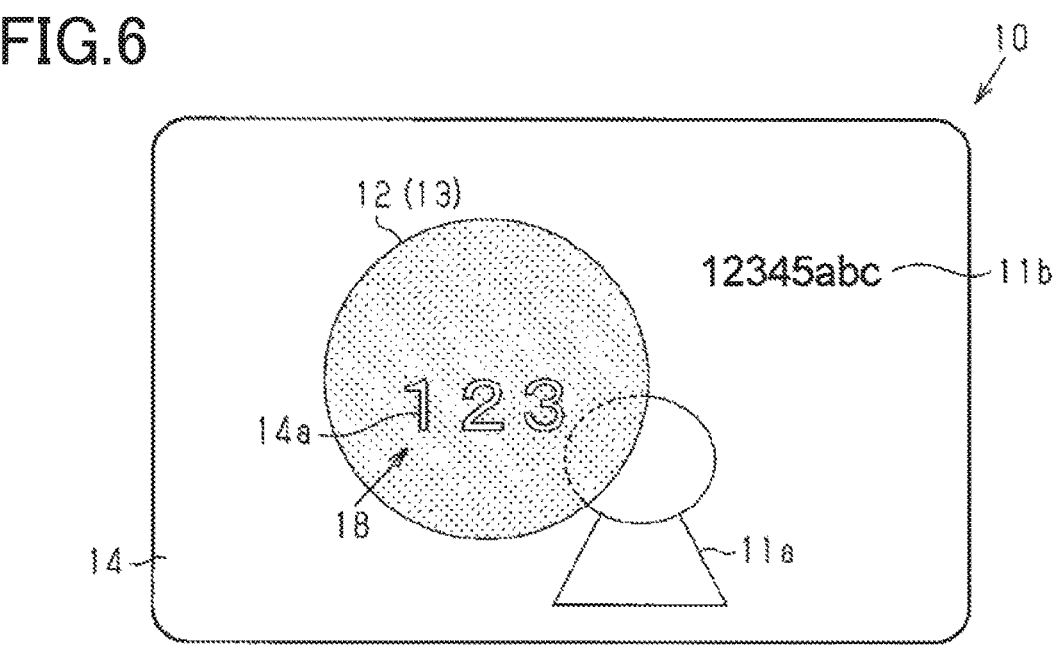
FIG. 6 is a plan view of the anti-counterfeiting structure that has been subjected to the laser irradiation for recording visible information on the allochroic layer.

As shown in FIG. 5, the anti-counterfeiting structure 10 is laser-irradiated to record visible information on the allochroic layer 11. At this time, a part of the allochroic layer 11 that overlaps with the foamable layer 12 and a part of the allochroic layer 11 that does not overlap with the foamable layer 12 in the plan view of the coating layer 14 are respectively laser-irradiated.

The energy of the laser beam LB emitted by the laser 20 is set to a level at which energy that is large enough to discolor the allochroic layer 11 reaches the allochroic layer 11. In other words, the energy of the laser beam LB is set to a level at which energy that is large enough to change a first material forming the allochroic layer 11 to a second material reaches the allochroic layer 11. In addition, the energy level of the laser beam LB and the position of the focal point thereof are set to prevent each of the layers other than the allochroic layer 11, the layers through which the laser beam LB passes, i.e., the coating layer 14, the foamable layer 12, the optical device 13, and the layers 16, from discoloring or foaming. These settings discolor only the part of the anti-counterfeiting structure 10 irradiated with the laser beam LB in the allochroic layer 11.

Carbonizing the first material that forms the allochroic layer 11 to provide the second material can form a discolored part in the allochroic layer 11. In other words, carbonization of the allochroic layer 11 caused by the laser irradiation discolors the allochroic layer 11 from a first color, or a pre-irradiated color, to a second color, or a post-irradiated color. On this occasion, the allochroic layer 11 preferably contains a material that is absorbent of the laser beam LB. A pigment is sufficient as such a material.

In a circumstance where the first material forming the allochroic layer 11 contains a pigment, variation in a crystal structure of a metal ion in the pigment or a hydration amount in the metal ion crystal caused by the laser beam LB irradiation changes the first material into the second material. A chemical change in such a pigment forms a discolored part in the allochroic layer 11. In other words, a chemical change in the pigment caused by the laser irradiation discolors the allochroic layer 11 from the first color, or the pre-irradiated color, to the second color, or the post-irradiated allochroic layer color.

The first material forming the allochroic layer 11 may contain a resin and a pigment. In a circumstance where the allochroic layer 11 contains a pigment, irradiating the part of the allochroic layer 11 with the laser beam LB increases a molecular density of the pigment in the irradiated part thereof, where the pigment is more concentrated than in another part of the allochroic layer 11. The laser-irradiated part of the allochroic layer 11 changes into the second material whose color is more dense than in the part of the allochroic layer 11 that is not irradiated with the laser beam LB. In other words, the condensation in the pigment caused by the laser irradiation discolors the allochroic layer 11 from a first color, or a less dense color, to a second color, or a more dense color.

The first material forming the allochroic layer 11 may also contain a dye. In a circumstance where the allochroic layer 11 contains a dye, irradiating the part of the allochroic layer 11 with the laser beam LB decomposes and decolorizes the dye in the irradiated part thereof, compared with another part of the allochroic layer 11. This changes the first material into the second material. The discolored part of the allochroic layer 11 irradiated with the laser beam LB changes into the second material whose color is less dense than in the part of the allochroic layer 11 that is not laser-irradiated. In other words, the decoloration of the dye caused by the laser irradiation discolors the allochroic layer 11 from the first color, a more dense color, to the second color, a less color.

As shown in FIG. 6, a facial image 11a and personal information 11b, both of which are examples of visible information, are recorded in the allochroic layer 11. In the plan view of the coating layer 14, a part of the facial image 11a overlaps with a part of the foamable layer 12, while none of the personal information 11b overlaps with the foamable layer 12.

The facial image 11a is typically an image corresponding to a face of an individual to be authenticated by use of the anti-counterfeiting structure 10. The personal information 11b is information on an individual to be authenticated by use of the anti-counterfeiting structure 10. The information includes characters, numbers, and the like, but may be a predetermined graphic or the like.

[How the Anti-Counterfeiting Structure Works]

Figure 7:
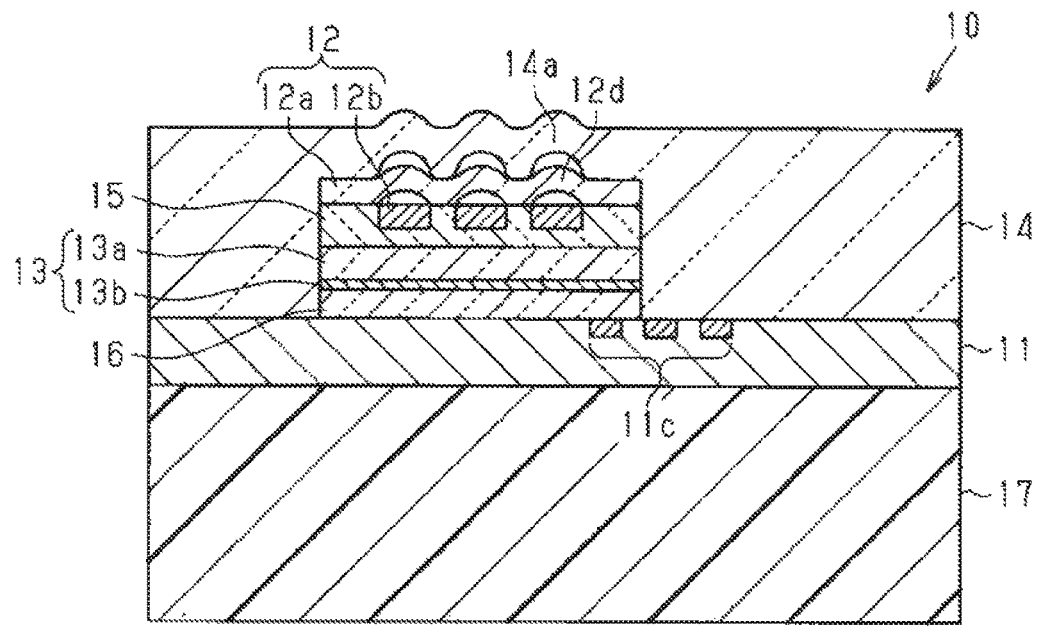
FIG. 7 illustrates the mechanism of the anti-counterfeiting structure.

A mechanism of the anti-counterfeiting structure 10 will be described with reference to FIGS. 7 to 9. As shown in FIG. 7, in the laser-irradiated anti-counterfeiting structure 10, a part of the foamable member 12a overlapping with each promoting member 12b1 in the plan view of the coating layer 14 has a foamed part 12d. The foamable member 12a has a plurality of foamed parts 12d, each being located apart from the remaining foamed parts 12d in the plan view of the coating layer 14.

Compared with a part of the foamable member 12a, i.e., a part where the foamed part 12d is not located, a part where each foamed part 12d is located protrudes away from the allochroic layer 11 in a thickness direction of the anti-counterfeiting structure 10. In other words, a surface of the foamable member 12a, a surface that is in contact with the coating layer 14, is a stepped surface. As a result, when a stress that is large enough to remove the coating layer 14 from the anti-counterfeiting structure 10 acts on a surface of the foamable layer 12, the protruding part on the surface of the foamable layer 12, or the foamed part 12d, tends to attract more stress than the other parts.

In the irradiated anti-counterfeiting structure 10, a part of the coating layer 14 overlapping with the promoting member 12b1 included in the predetermined part in the plan view of the coating layer 14, has a foamed part 14a. The coating layer 14 has a plurality of foamed parts 14a, each being located apart from the remaining foamed parts 14a in the plan view of the coating layer 14. The location of each foamed part 14a in the coating layer 14 substantially overlaps with a position of one foamed part 12d in the foamable layer 12 in the plan view of the coating layer 14.

Compared with a part of the coating layer 14, i.e., a part where the foamed part 14a is not located, a part where each foamed part 14a is located protrudes in a direction away from the allochroic layer 11 in a thickness direction of the anti-counterfeiting structure 10. In other words, a step is formed in a part of the coating layer 14, a part constituting a part of an outer surface of the anti-counterfeiting structure 10.

As a result, when a stress that is large enough to remove the coating layer 14 from the anti-counterfeiting structure 10 is applied on a surface of the coating layer 14, the protruding part on the surface of the coating layer 14, or the foamed part 14a, tends to attract more stress than the other parts. In addition, the observer of the anti-counterfeiting structure 10 can recognize the visible information 18 by touching the anti-counterfeiting structure 10.

In the irradiated anti-counterfeiting structure 10, a discolored part 11c is formed in a part of the allochroic layer 11, a laser-irradiated part. The discolored part 11c forms the facial image 11a and personal information 11b described above in a plan view of the cover layer 14. The discolored part 11c is a part of the allochroic layer 11 and is constituted by the second material.

Figure 8:
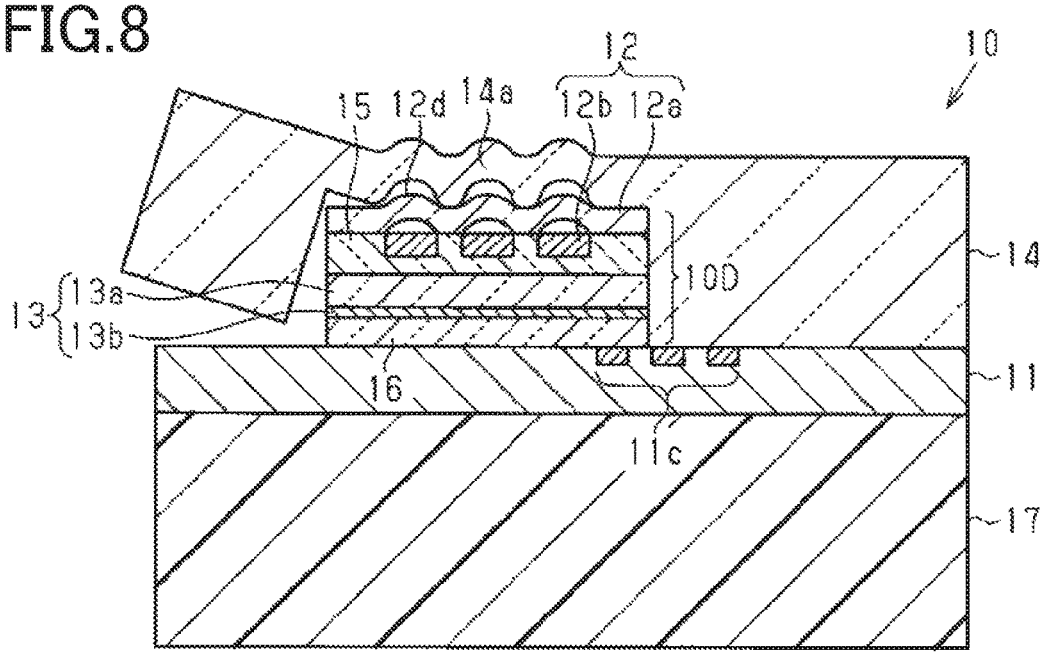
FIG. 8 illustrates the mechanism of the anti-counterfeiting structure.

As shown in FIG. 8, a person attempting to counterfeit the anti-counterfeiting structure 10 removes the coating layer 14 from the allochroic layer 11 for the optical device 13 provided with the anti-counterfeiting structure 10, the coating layer covering the device structure 10D including the foamable layer 12 and the optical device 13.

As described above, the coating layer 14 and the foamable layer 12 are bonded together more weakly than the foamable layer 12 and the optical device 13 are, and even more weakly than the allochroic layer 11 and the adhesive layer 16 are. When removed from the allochroic layer 11 by the counterfeiter, the coating layer 14 comes off from the foaming layer 12, while the foamable layer 12 and the optical device 13 as well as the adhesive layer 16 and the allochroic layer 11 tend to remain bonded.

At the time when the coating layer 14 comes off from the foamable layer 12, the stress applied by the counterfeiter to the anti-counterfeiting structure 10 acts on the foamed part 12d, which is mechanically weaker than the other parts. In addition, the stress applied by the counterfeiter to the anti-counterfeiting structure 10 acts on the foamed part 14a of the coating layer 14, which is mechanically weaker than the other parts.

Figure 9:
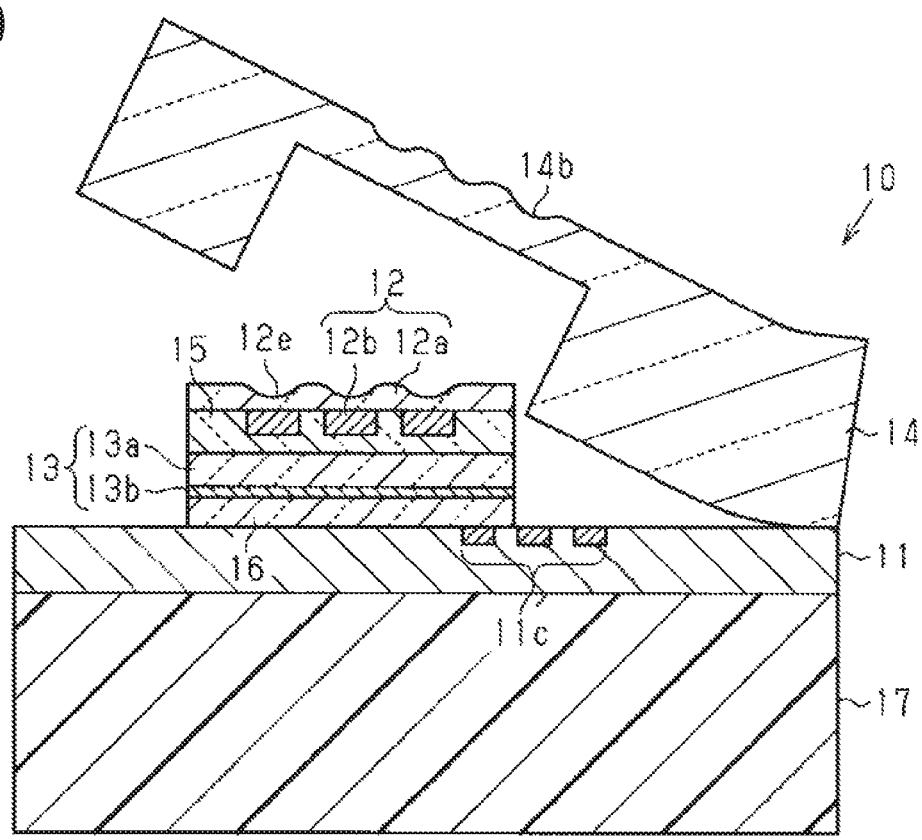
FIG. 9 illustrates the mechanism of the anti-counterfeiting structure.

As shown in FIG. 9, when the counterfeiter removes the coating layer 14 from the foamable layer 12, the foamed part 12d of the foamable layer 12 assumes a state that is different from what it was before the counterfeiter removed the coating layer 14 from the foamable layer 12. This forms a deformable part 12e as a trace of the coating layer 14 being removed from the foamable layer 12 in a part where the foamed part 12*d* was located before the coating layer 14 was removed from the foamable layer 12.

The deformable part 12*e* of the foamable layer 12 is a crushed part of the foamed part 12*d* and a part where the foamed part 12*d* has deformed from what it was shaped as before the coating layer 14 was removed from the foamable layer 12, the crushing being due to discharge of bubbles retained between the foamed part 12*d* and the foam-promoting portion 12*b* to an outside of the foamable member 12*a*.

In addition, when the counterfeiter removes the coating layer 14 from the foamable layer 12, the foamed part 14*a* of the coating layer 14 assumes a state that is different from what it was before the counterfeiter removed the coating layer 14 from the foamable layer 12. This forms a deformable part 14*b* as a trace of the coating layer 14 being removed from the foamable layer 12 in a part where the foamed part 14*a* was located before the coating layer 14 is removed from the foamable layer 12.

The deformable part 14*b* of the foamable layer 14 is a crushed part of the foamed part 14*a* and a part where the foamed part 14*a* has deformed from the shape before the coating layer 14 was removed from the foamable layer 12, the crushing being due to discharge of bubbles retained between the foamed part 14*a* and the foamable member 12*a* to an outside of the coating layer 14.

As described above, at the time of removal of the device structure 10D from the allochroic layer 11, the deformable part 12*e* is formed in the foamable layer 12. As a result, even if the counterfeiter counterfeits the anti-counterfeiting structure 10 by attaching the device structure 10D including the foamable layer 12 and the optical device 13 to a counterfeited allochroic layer, the anti-counterfeiting structure inevitably includes the device structure 10D having a trace indicating that the device structure 10D has been removed from a genuine anti-counterfeiting structure 10. This can prevent counterfeiting of the anti-counterfeiting structure 10 from being carried out by removal of the optical device 13 from the anti-counterfeiting structure 10.

[How to Manufacture the Anti-Counterfeiting Structure]

A method of manufacturing the anti-counterfeiting structure 10 will be described with reference to FIGS. 10 and 12. Before the method of manufacturing the anti-counterfeiting structure 10 is described, a method of manufacturing a transfer foil for manufacturing the anti-counterfeiting structure 10 will be described. Note that FIG. 10 shows a part of a cross-sectional structure of the transfer foil for convenience of illustration.

Figure 10:
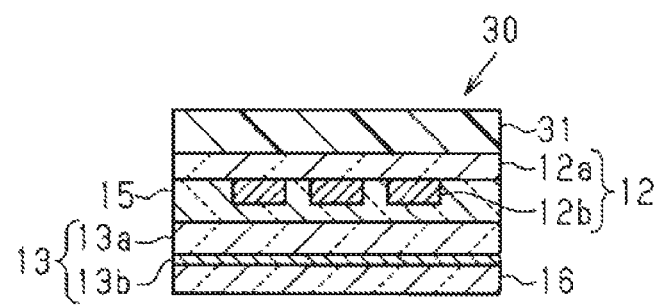
FIG. 10 is a partial cross-sectional view of a transfer foil for forming the anti-counterfeiting structure.

As shown in FIG. 10, a transfer foil 30 includes a support layer 31. The foamable layer 12, the intermediate layer 15, the optical device 13, and the adhesive layer 16 are stacked on a surface of the support layer 31 in the stated order.

[Support Layer]

A first step to form the transfer foil 30 is to prepare the support layer 31. The support layer 31 may have heat resistance against heat applied to the support layer 31 during a course of forming the transfer foil 30 and mechanical strength that can withstand a force applied to the support layer 31 during a course of forming the transfer foil 30.

The material of the support layer 31 may be a synthetic resin, a natural resin, paper, or synthetic paper. The support layer 31 may have a single-layer structure constituted by one of the layers formed by the respective forming materials or may have a multilayer structure constituted by two or more thereof.

When the material that forms the support layer 31 is a synthetic resin, suitable forming materials include polyvinyl chloride, polyester, polycarbonate, polymethyl methacrylate, polystyrene, polyethylene, polyethylene terephthalate, polyethylene naphthalate, polypropylene, and polyvinyl alcohol.

The support layer 31 is preferably approximately 25 μm or more to 50 μm or less thick in terms of operability and processability thereof.

[Foamable Member]

A foamable member 12*a* constituting the foamable layer 12 is then formed on one surface of the support layer 31. The foamable member 12*a* also acts as a peelable layer configured to enable removal of the support layer 31 from another layer stacked on the support layer 31 of the transfer foil 30.

The foamable member 12*a* is a member that foams when it is laser-irradiated. The foamable member 12*a* is configured such that the material that forms the foamable member 12*a* decomposes to generate a gas, for example, when the foamable member 12*a* warms up until it reaches a predetermined temperature.

The foamable member 12*a* may only be transmissible to a laser beam and be able to withstand a thermal pressure applied to the foamable member 12*a* when the transfer foil 30 is thermally transferred. The foamable member 12*a* can be formed of a resin, specifically a thermoplastic resin, a thermosetting resin, an ultraviolet curable resin, or an electron beam curable resin.

When the foamable member 12*a* is formed of a thermoplastic resin, the resin needs to be heat-resistant. Preferable thermoplastic resins include a polycarbonate resin, a polyether imide resin, a cyclic polyolefin copolymer, a modified norbornene resin, a polyamide imide resin, a polyimide resin, and a nitrocellulose resin.

[Foam-Promoting Portion]

The foam-promoting portion 12*b* is formed on a surface of the foamable member 12*a* opposite to a surface which is in contact with the support layer 31. At this time, one promoting member 12*b*1 forms a plurality of promoting members 12*b*1 on the surface of the foamable member 12*a* opposite to the surface in contact with the support layer 31 so as to be away from the other promoting members 12*b*1 in a plan view of the support layer 31.

The foam-promoting portion 12*b* may be configured to cause the foamable member 12*a* to foam when it is laser-irradiated, the foamable member 12*a* being in contact the foam-promoting portion 12*b*. In other words, the foam-promoting portion 12*b* may be configured to have a characteristic of promoting an unfoamed part of the foamable member 12*a* to assume a foamed state, the part being in contact with the foam-promoting portion 12*b*. The foam-promoting portion 12*b* has, for example, a function of increasing energy of the laser beam applied to the foam-promoting portion 12*b*, applying to the foamable member 12*a* more energy than in a state in which the foamable member 12*a* is not in contact with the foam-promoting portion 12*b*.

The foam-promoting portion 12*b* thus heats the foamable member 12*a* to a temperature higher than it heats the foamable member 12*a* when the foamable member 12*a* is laser-irradiated with the foamable member 12*a* being not in contact with the foam-promoting portion 12*b*, and decomposes a part of the foamable member 12*a*. Decomposing the foamable member 12*a* produces carbon- or oxygen-containing gas constituting the foamable member 12*a* because the foamable member 12*a* is formed of various resins as described above.

The foam-promoting portion 12*b* can be formed of an ink that scatters infrared light having a 1064-nm wavelength, a reflective ink, or an absorbent ink. The ink reflecting the infrared light having the 1064-nm wavelength may be an ink containing a pearl pigment. Note that the infrared light having a 1064-nm wavelength is used during laser printing, that is, when visible information is recorded on the allochroic layer 11 by use of a laser.

A pigment-containing ink may be used as the ink that scatters infrared light. A particle of a compound can be used as the pigment, and an inorganic compound can be used as the particle of the compound. The inorganic compound may be titanium oxide, silica, or alumina. The ink that absorbs the infrared light having the 1064-nm wavelength may be a polymer having a molecular bond that absorbs the infrared light having the 1064-nm wavelength. The pearl pigment typically includes a core part formed of mica and a coating part covering the core part. The coating part may be formed of any material that makes the mica reflective. The material may assume a transparent color in a visible region and may be metal oxide, metal sulfide, metal selenide, and metal chloride or other material having a refractive index of 2.0 or greater.

An inorganic compound can be used to form the coating part. Suitable inorganic compounds include $Sb_2S_3$, $Fe_2O_3$, PbO, ZnSe, CdS, $Bi_2O_3$, $TiO_2$, $PbCl_2$, $CeO_2$, $Ta_2O_5$, ZnS, ZnO, CdO, $Nd_2O_3$, $Sb_2O_3$, SiO, and $In_2O_3$. The coating part may have a single-layer structure constituted by one of the layers formed by the respective forming materials or may have a multilayer structure constituted by two or more thereof.

The pearl pigment, incidentally, has an effect of promoting laser marking of a resin, that is, discoloration of the resin. The pearl pigment is recognized to have a function of enabling a polyolefin resin to discolor when the pearl pigment is added to a polyolefin resin and other material that do not discolor even when it is laser-irradiated.

It is also recognized that the mica forming the core part of the pearl pigment sensitizes a reaction in the resin caused by the laser beam. In other words, the core and coating parts constituting the pearl pigment have a function of absorbing the laser beam to make the resin that is in contact with the pearl pigment warmer than when these parts are laser-irradiated in a state in which the pearl pigment is not in contact the resin. This allows decomposition of the resin to form carbon in the resin with a result that the generated carbon is recognized as a black discolored part. Note that, in a configuration where the coating part contains $TiO_2$ or the resin contains $TiO_2$, the laser irradiation produces black low-order titanium oxide.

In addition, in a circumstance where there is a difference in refractive index by more than 0.4 between the core part and the coating part, the pearl pigment is highly reflective to white light incident thereon and is birefringent at an interface between the core part and the coating part. The pearl pigment can thus reflect rainbow-colored light. The pearl pigment to be used to form the foam-promoting portion 12b has only to have a function of causing the foamable member 12a to foam. The pearl pigment therefore may be one that reflects the rainbow-colored light, or may be one that reflects bicolored light.

The pearl pigment may assume a spherical shape, a scaly shape, and other shape. A pearl pigment having a spherical particle is preferably around 1 µm or more to 50 µm or less on average in diameter, more preferably around 1 µm or more to 15 µm or less.

[Intermediate Layer]

The intermediate layer 15 of the foamable member 12a is formed to fill a gap between the foam-promoting portions 12b in the plan view of the support layer 31 on a side opposite to a side that is in contact with the support layer 31 and to cover the foam-promoting portions 12b in a thickness direction of the foamable member 12a.

The intermediate layer 15 is preferably formed of a resin that protects the foam-promoting portion 12b and is heat-resistant to an extent that does not inhibit the optical device 13 from being formed. The intermediate layer 15 may be formed of any of a thermoplastic resin, a thermosetting resin, an ultraviolet curable resin, and an electron beam curable resin.

The intermediate layer 15 may be preferably formed of a polyester resin, a polycarbonate resin, a polyarylate resin, a polysulfone resin, a polyethersulfone resin, a polyetherimide resin, a cyclic polyolefin copolymers, modified norbornene resin, a polyamideimide resin, a nitrocellulose resin, or the like.

Particles are preferably added to the resin material forming the intermediate layer 15.

The particle preferably has a diameter smaller than or equal to the pigment present in the foam-promoting portion 12b, preferably 1 µm or more to 30 µm or less.

If the material that forms the intermediate layer 15 contains a particle with a diameter less than or equal to the diameter of the pigment particle, a particle in the forming material easily falls into a gap formed between the promoting members 12b1. As a result, the gap formed between the promoting members 12b1 is filled more easily with the material that forms the intermediate layer 15. This facilitates protection of a shape of each promoting member 12b1 by the intermediate layer 15, compared with a configuration in which the gap is formed between the respective promoting members 12b1.

The particle may be formed of either an organic material or an inorganic material.

When the particle is formed of an organic material, suitable particles may be of Teflon powder (Teflon is registered trademark), a polyethylene powder, a silicone-based fine particle, or an acrylonitrile-based fine particle. When the particle is formed of an inorganic material, the particle may be, for example, a silica particle.

An amount of the particles in the material that forms the intermediate layer 15 may be determined by a color tone required of the intermediate layer 15, transparency, and marking efficiency required of part of the allochroic layer 11 overlapping with the intermediate layer 15 in the plan view of the coating layer 14, that is, a degree of discoloration relative to energy applied to the allochroic layer 11. The amount of the particles is preferably 0.05 wt % or more to 50 wt % or less relative to the resin described above, and more preferably 0.5 wt % or more to 20 wt % or less.

[Optical Device]

The optical device 13 is formed on a surface of the intermediate layer 15, a surface opposite to a surface in contact with the foamable layer 12.

As described above, the optical device 13 is preferably an OVD. The OVD is an optical device that reproduces a different image when a visual direction of the OVD changes to another direction. Examples of the OVD include a hologram, a diffraction grating, and a multilayer film.

The hologram and the diffraction grating may each be of a relief type, which records an interference fringe of light as a fine uneven pattern on a plane or of a volume type, which records the interference fringe in a thickness direction of the optical device 13.

In a circumstance where the optical device 13 is a relief-type hologram or a relief-type diffraction grating, the optical device 13 has a forming part 13a and an amplifying part 13*b*, the forming part 13*a* having a relief surface with a fine uneven pattern, and the amplifying part 13*b* covering a relief surface of the forming part 13*a*.

The first step in forming the relief-type hologram or relief-type diffraction grating is to form a master plate of the relief surface having the fine uneven pattern, and then form a nickel press plate having a reproduction of the uneven pattern of the master plate by an electroplating method.

The next step is to form a coating film for forming the forming part 13*a* on the surface of the intermediate layer 15 opposite to the surface in contact with the foamable layer 12 before forming a forming part 13*a* having the relief surface by curing the coating film with the press plate being pressed against the coating film.

The following step is to form the amplifying part 13*b* for enhancing a diffraction efficiency in the relief-type hologram or the relief-type diffraction grating on at least a part of the relief surface of the forming part 13*a*.

The forming part 13*a* may be a layer where the relief surface is formed by the press plate being pressed thereagainst, and may be formed of an ultraviolet curable resin, a thermosetting resin, a thermoplastic resin, or an electron beam curable resin, etc., more specifically, epoxy (meth) acrylic or urethane (meth)acrylate. The forming part 13*a* may have a single-layer structure constituted by only one of the layers formed by the respective forming resins described above or may have a multilayer structure constituted by two or more thereof.

Note that the forming part 13*a* may be formed not only of the materials described above, but of a material having a relief surface, a material that is capable of forming a layer configured to reproduce a different image when a visual direction of the optical device 13 changes to another direction.

The forming part 13*a* may be formed by a photopolymer method. In the photopolymer method, the forming part 13*a* can be formed of a monomer, an oligomer, or a polymer having an ethylenic unsaturated bond or an ethylenically unsaturated group.

Suitable monomers include 1,6-hexanediol, neopentyl glycol diacrylate, trimethylolpropane triacrylate, pentaerythritol triacrylate, pentaerythritol tetraacrylate, dipentaerythritol pentaacrylate, and dipentaerythritol hexaacrylate. Suitable oligomers include epoxy acrylate, urethane acrylate, and polyester acrylate. Suitable polymers include a urethane-modified acrylic resin and an epoxy-modified acrylic resin.

The monomer, oligomer, and polymer having the ethylenically unsaturated bond or the ethylenically unsaturated group may be used in mixture of two or more of the materials listed above. In addition, the monomers, the oligomers, and the polymers can be mutually crosslinked by imparting in advance a reactive group that undergoes a crosslinking reaction to the monomers, oligomers and polymers listed above and by use of an isothiocyanate compound, a silane coupling agent, an organic titanate crosslinking agent, an organic zirconium crosslinking agent, or organic aluminate.

Further, the monomer, oligomer, and polymer having the ethylenically unsaturated bond or the ethylenically unsaturated group may be used in mixture with another resin. In this circumstance, the monomer and other component can be crosslinked with a skeleton of another resin by imparting in advance a reactive group that undergoes a crosslinking reaction to the monomers, oligomers and polymers listed above and by use of, for example, an isothiocyanate compound, a silane coupling agent, an organic titanate crosslinking agent, an organic zirconium crosslinking agent, or organic aluminate.

Such a method makes it possible to obtain the polymers having the ethylenically unsaturated bond or the ethylenically unsaturated group. These polymers provide high moldability of the relief surface and are less liable to stain the press block because they are solid at normal temperature and are less tacky.

When photocationic polymerization is used for curing the forming part 13*a*, the forming part 13*a* can be formed of monomers, oligomers and polymers having an epoxy group, oxetane skeleton-containing compounds and vinyl ethers.

During cure of the electron beam curable resin among the resins listed above by use of ultraviolet and other rays, a photopolymerization initiator may be added to the electron beam curable resin. Suitable photopolymerization initiators include photoradical polymerization initiators, photocationic polymerization initiators, and a combination type of photoradical polymerization initiator and photocationic polymerization initiator, or of a hybrid type, depending on the resin to which the photopolymerization initiator is added.

Suitable photoradical polymerization initiators include benzoin compounds, anthraquinone compounds, phenyl ketone compounds, benzil dimethyl ketal, thioxanthone, acylphosphine oxide, and Michler's ketone. The benzoin compounds include benzoin, benzoin methyl ether and benzoin ethyl ether. The anthraquinone compounds include anthraquinone and methylanthraquinone. The phenyl ketone compounds include acetophenone, diethoxyacetophenone, benzophenone, hydroxyacetophenone, 1-hydroxycyclohexyl phenyl ketone, α-aminoacetophenone and 2-methyl-1-(4-methylthiophenyl)-2-morpholinopropane-1-one.

The photocationic polymerization initiator may be an aromatic diazonium salt, an aromatic iodonium salt, an aromatic sulfonium salt, an aromatic phosphonium salt, a mixed ligand metal salt, or the like.

The hybrid type photopolymerization initiator may be a photopolymerization initiator prepared by mixing the photoradical polymerization initiator and the photocationic polymerization initiator, or may be a photopolymerization initiator that is capable of initiating both the photopolymerization and the photocationic polymerization. Suitable photopolymerization initiators that are capable of initiating both the photoradical polymerization and the photocationic polymerization include an aromatic iodonium salt and an aromatic sulfonium salt.

A blending amount of the photopolymerization initiator relative to the electron beam curable resin may be determined according to the electron beam curable resin and the photopolymerization initiator. The photopolymerization initiator is preferably added at a ratio between 0.1 wt % or more and 15 wt % or less to the electron beam curable resin.

In addition, a sensitizing dye may be added to a mixture containing the electron beam curable resin and the photopolymerization initiator. Still further, a dye, a pigment, various additives, a crosslinking agent, etc. may be added as necessary. In order to improve the moldability of the forming part 13*a*, a resin nonreactive to the photopolymerization reaction may be added.

Examples of the various additive include a polymerization inhibitor, a leveling agent, a defoaming agent, an antifouling agent, an adhesion improving agent, a coating surface modifying agent, a plasticizer, and a nitrogen-containing compound. An exemplary crosslinking agent is an epoxy resin. The nonreactive resin may be the thermoplastic resin or thermosetting resin listed above.

The amplifying part 13b is a part configured to enhance the diffraction efficiency on the relief surface of the forming part 13a, and is formed of a material having a different refractive index from the resin forming the relief surface, that is, a polymeric material. The amplifying part 13b may be formed of a dielectric material such as $TiO_2$, $Si_2O_3$, SiO, $Fe_2O_3$, and ZnS, or of a metallic material such as Sn, Cr, Ni, Cu, and Au. The amplifying part 13b may have a single-layer structure constituted by only one of the layers formed by the respective forming materials listed above or may have a multilayer structure constituted by two or more thereof.

The amplifying part 13b can be formed by a vacuum deposition method, a sputtering method, and other method. The thickness of the amplifying part 13b is approximately 50 Å or more to 10000 Å or less according to a function required thereof.

The amplifying part 13b may be formed on the whole relief surface of the forming section 13a, but may be formed on a part of the relief surface. Forming the amplifying part 13b on the part of the relief surface follows the steps of: printing an ink containing a water-soluble resin on the part of the relief surface where the amplifying part 13b is not to be formed; forming a film for forming the amplifying part 13b on the whole relief surface; and washing the water-soluble resin to remove the film formed on a part overlapping with the water-soluble resin in the thickness direction of the optical device 13.

The amplifying part 13b can be also formed in a part of the relief surface in the steps of: forming a film for forming the amplifying part 13b on the whole relief surface; forming a mask in an area on the relief surface for the amplifying part 13b, the area being part of the film; and exposing the film to an alkaline or acidic chemical that dissolves the film to remove the part of the amplifying part 13b. Using a laser is another method such as a laser removing method to remove the part of the film for forming the amplifying part 13b.

Thus forming the amplifying part 13b on a part of the relief surface makes it possible for the anti-counterfeiting structure 10 having the optical device 13 to represent predetermined visible information formed by the amplifying part 13b, which can in turn provide a better design of the anti-counterfeiting structure 10.

When the adhesive layer 16 is formed of a material that is cured by irradiation with ultraviolet rays or an electron beam, and when the amplifying part 13b is formed of a material that allows substantially no transmission of the ultraviolet rays and the electron beam, forming the amplifying part 13b on the part of the relief surface can provide the following effects.

In other words, emitting ultraviolet rays or an electron beam from the foamable layer 12 toward the adhesive layer 16 does not irradiate the part overlapping with the amplifying part 13b in a plan view of the optical device 13, but does irradiate the part not overlapping with the amplifying part 13b.

Naturally, the part of the adhesive layer 16 irradiated with the ultraviolet rays or the electron beam is cured, while the unirradiated part is not cured. During removal of device structure 10D from the allochroic layer 11, therefore, the cured part of the adhesive layer 16 is hardly removed from the allochroic layer 11, whereas the uncured part is easily removed therefrom. Part of the device structure 10D is consequently easily broken by a force applied thereto during the removal of the device structure 10D from the color change layer 11.

On the other hand, when the optical device 13 is a multilayer film formed from a plurality of thin films, a multilayer film that causes the optical device 13 to present a different image color in response to a change in the visual direction thereof, the optical device 13 is constituted as described below.

The optical device 13 is a multilayer film constituted by a plurality of layers each having a different optical characteristic. Typically, a material with a refractive index over approximately 1.5 and below 2 is referred to as a low refractive index material, while a material with a refractive index of 2 or greater is referred to as a high refractive index material. A layer formed of a high refractive index material is referred to as a high refractive index layer, while a layer formed of a low refractive index material is referred to as a low refractive index layer.

A multilayer film including both a low refractive index layer and a high refractive index layer may be a structure of two or more high refractive index layers and one low refractive index layer alternately stacked. Each layer of the multilayer film may be formed of the materials shown in the following Table 1.

TABLE 1

| Material | Refractive index (n) | Material | Refractive index (n) |
| --- | --- | --- | --- |
| $Sb_2S_3$ | 3.0 | SiO | 2.0 |
| $Fe_2O_3$ | 2.7 | $Si_2O_3$ | 2.5 |
| $TiO_2$ | 2.6 | $In_2O_3$ | 2.0 |
| CdS | 2.6 | PbO | 2.6 |
| $CeO_2$ | 2.3 | $Ta_2O_3$ | 2.4 |
| ZnS | 2.3 | $ZnO_2$ | 2.1 |
| $PbCl_2$ | 2.3 | $ZrO_2$ | 2.0 |
| CdO | 2.2 | $Cd_2O_3$ | 1.8 |
| $Sb_2O_3$ | 2.0 | $WO_3$ | 2.0 |

Note that, in addition to the materials shown in Table 1, layers constituting the multilayer film may be formed solely of Fe, Mg, Zn, Au, Ag, Cr, Ni, and Cu, and other metal or of an alloy containing at least two of these, or may be formed of Si.

The layers constituting the multilayer film may be also formed of an organic polymer with a low refractive index, including polyethylene, polypropylene, polytetrafluoroethylene, polymethyl methacrylate, and polystyrene. Incidentally, the refractive indexes of these materials are, 1.51 for polyethylene, 1.49 for polypropylene, 1.35 for polytetrafluoroethylene, 1.49 for polymethyl methacrylate, and 1.60 for polystyrene. In addition, a layer formed of these organic polymers is a low refractive index layer.

The multilayer film may have a structure in which at least one layer with a predetermined thickness selected from the high refractive index layer described above and a metal layer with a light transmittance between 30% or more and 60% or less and at least one layer with a predetermined thickness selected from low refractive index layers are alternately stacked. A multilayer film with such a structure can be configured to have a characteristic of absorbing or reflecting visible light having a predetermined wavelength.

Each layer of the multilayer film may be formed of a material selected from the above materials according to optical characteristics such as refractive index, reflectance, and transmittance, weather resistance, interlayer adhesiveness, etc.

Each layer of the multilayer film may be formed by a vacuum deposition method, a sputtering method, and other method. These methods can control a thickness, film formation rate, optical film thickness (optical film thickness=n× d, where n: refractive index, d: film thickness), etc.

[Adhesive Layer]

The adhesive layer 16 is formed overall on a surface of the optical device 13 opposite to a surface which is in contact with the intermediate layer 15. The adhesive layer 16 is a layer for fixing a structure constituted by the support layer 31, the foamable layer 12, the intermediate layer 15, and the optical device 13 to the allochroic layer 11.

The adhesive layer 16 is preferably formed of a pressure sensitive material, that is, a resin that exhibits adhesion to the allochroic layer 11 by application of pressure to the adhesive layer 16. A thermoplastic resin can be used to form the adhesive layer 16. An acrylic resin, a vinyl chloride-vinyl acetate copolymer, an epoxy resin, and an ethylene-vinyl acetate copolymer (EVA) are suitable as the thermoplastic resin.

The adhesive layer 16 may be formed by use of a gravure coater, a micro gravure coater, a roll coater, and the like.

The transfer foil 30 to be used for manufacturing the anti-counterfeiting structure 10 is thereby formed.

[Allochroic Layer]

The first step to manufacture the anti-counterfeiting structure 10 by use of the transfer foil 30 is to prepare the allochroic layer 11.

The allochroic layer 11 may be configured to exhibit, in response to laser irradiation, a color different from that before being irradiated. In other words, the allochroic layer 11 may have a characteristic of changing a first material thereof to a second material in response to laser irradiation. The allochroic layer 11 may be formed of an inorganic material, a metallic material, an organic material, and a polymer material. The allochroic layer 11 is preferably formed of a material having a characteristic of starting discoloration when it is laser-irradiated with a predetermined or higher level of intensity, that is, having a threshold of the intensity of the laser beam.

The allochroic layer 11 may be formed of a material that is capable of absorbing laser pulse energy, carbonizing at a temperature equal to or higher than a predetermined temperature, and recording information. Such materials are a material containing polycarbonate as a main component and a material containing polyester as a main component.

The allochroic layer 11 may be also formed of a mixture organized to develop color by laser irradiation. The mixture may be a mixture of a black color-developing layer and a color-developing layer. Among such mixtures, a mixture containing a thermally responsive microcapsule is preferable in requiring a low level of energy for coloring the allochroic layer 11, compared with a mixture containing no thermoresponsive microcapsules.

The allochroic layer 11 may be also formed of a mixture organized to develop color by laser irradiation. The mixture can contain an allochroic compound that discolors by laser irradiation and a photosensitive resin. Examples of the photosensitive resin include an ultraviolet curable resin and an electron beam curable resin. Preferably, such a mixture includes a promoting compound that promotes modification of the discolored compound by laser irradiation, or bonds the promoting compound to a skeleton of the photosensitive resin for convenience of control over a threshold temperature at which the mixture discolors.

The allochroic layer 11 may be also formed of a synthetic resin containing an additive.

The additive may be at least one of a synthetic resin modified by laser irradiation, an inorganic material that promotes the modification of a synthetic resin as a main component by laser irradiation, a synthetic resin that contains an organic material, and an inorganic material that absorbs a laser beam and produces heat.

In addition, the allochroic layer 11 may be formed of a mixture containing a transparent resin and at least one of a light-absorbent material and a thermosensitive coloring material.

The allochroic layer 11 may be formed as a film formed by use of the materials for forming the allochroic layer 11 listed above. The allochroic layer 11 may be formed by wet-coating on a surface of another layer a coating liquid produced by dissolving in a solution the material that forms the allochroic layer 11 or a coating liquid dispersed in a liquid. The allochroic layer 11 may be also formed on one surface of another layer by a dry coating method such as vacuum deposition and sputtering.

[Transferring]

Figure 11:
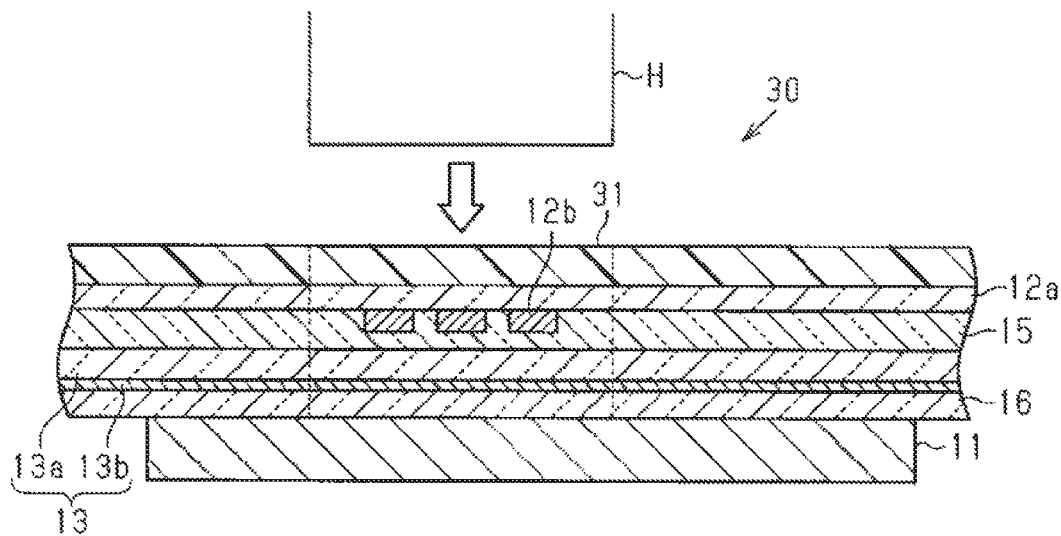
FIG. 11 illustrates a step in a method for manufacturing the anti-counterfeiting structure.

As shown in FIG. 11, the transfer foil 30 is transferred to a part of the allochroic layer 11 in the plan view of the allochroic layer 11 in a state such that the adhesive layer 16 of the transfer foil 30 maintains contact with the allochroic layer 11. The transfer foil 30 may be spot-transferred to the allochroic layer 11 by a vertical stamping method, or transferred thereto by a roll transfer method.

The first step of transferring the transfer foil 30 to the allochroic layer 11 by use of the vertical stamping method is to overlap the transfer foil 30 with one side of the allochroic layer 11 in a state such that the adhesive layer 16 of the transfer foil 30 faces the allochroic layer 11. The next step is to press a heated hot stamp H against the support layer 31 of the transfer foil 30. This softens a part of the adhesive layer 16 overlapping with the hot stamp H in a plan view of the allochroic layer 11 and adheres the softened part to the allochroic layer 11.

Figure 12:
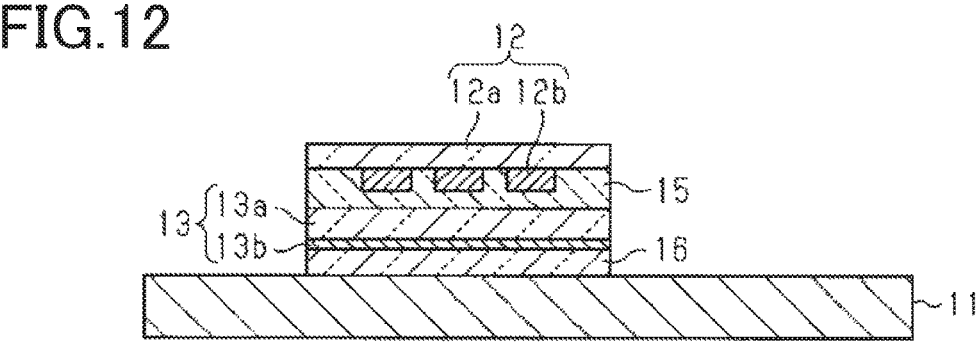
FIG. 12 illustrates a step in the method for manufacturing the anti-counterfeiting structure.

As shown in FIG. 12, a position of the transfer foil 30 relative to the allochroic layer 11 is changed from a relative position when a part of the transfer foil 30 is adhered.

This removes the support layer 31 from the foamable member 12a at the part of the transfer foil 30 to which the adhesive layer 16 is adhered, and consequently transfers the part of the transfer foil 30 to the allochroic layer 11.

[Base Material]

The subsequent step is to prepare a base material 17. When the anti-counterfeiting structure 10 is a card of various types, the base material 17 is preferably formed of polycarbonate (PC). The base material 17 is also preferably formed of polyethylene terephthalate (PET), thermoplastic polyester having noncrystalline property (PETG), polyvinyl chloride (PVC), or an ABS resin.

The base material 17 may have a single-layer structure constituted by one of the layers formed by the respective resins listed above or may have a multilayer structure constituted by two or more thereof.

Note that the base material 17 may be attached to one surface of the allochroic layer 11 before a part of the transfer foil 30 is transferred to the allochroic layer 11. Alternatively, the allochroic layer 11 may be formed on one surface of the base material 17.

[Coating Layer]

The next step is to prepare the coating layer 14. Preferably, the allochroic layer 11 to which the device structure 10D has been transferred is then sandwiched between the base material 17 and the coating layer 14, to laminate the base material 17, the coating layer 14, and the allochroic 11. These are the steps of producing an anti-counterfeiting structure 10 having the structure described earlier with reference to FIG. 1.

Note that the coating layer 14 may be formed by application of a coating liquid that contains a material that forms the coating layer 14 on the surface of the allochroic layer 11 to which the device structure 10D has been transferred.

The coating layer 14 may be configured to be transmissible to a laser beam. The coating layer 14 preferably has a 60% or more to 100% or less transmittance to the light present in the visible light region, more preferably an 80% or more to 100% or less transmittance.

In addition, the coating layer 14 is a layer that foams in response to laser irradiation. The coating layer 14 has a function of decomposing the material forming the coating layer 14 and generating gas when the coating layer 14 reaches a predetermined or higher temperature.

The coating layer 14 is formed of a light-transmissible resin. Suitable light-transmissible resins include polycarbonate (PC), plant-derived polycarbonate (bio PC), polyethylene terephthalate (PET), polysiloxane 1,4-dimethyl phthalate (PCT), polystyrene (PS), polymethyl methacrylate (PMMA), transparent acrylonitrile butadiene styrene copolymerized synthetic resin (MABS), polyvinyl chloride (PVC), polypropylene (PP), and polyethylene (PE) polyacetal.

The coating layer 14 may be configured to absorb, reflect, or scatter the laser beam applied to the coating layer 14 as long as it is transmissible to the laser beam and is configured to foam in response to laser irradiation.

When the coating layer 14 is configured to absorb a part of the laser beam emitted onto it, the following effect can be achieved in a part where the allochroic layer 11 and the coating layer 14 are in contact with each other during laser irradiation for discoloring the allochroic layer 11 from the substrate 17 toward the allochroic layer 11.

In other words, the coating layer 14 absorbs parts of the laser beam emitted onto the allochroic layer 11 that have passed through the coating layer 14 without being absorbed by the allochroic layer 11. Then the part of the coating layer 14 that has absorbed the laser beam produces heat, and a part of the heat is transmitted to the allochroic layer 11. This can facilitate discoloration of a part of the allochroic layer 11. Note that, in such a configuration, the allochroic part of the allochroic layer 11 and the coating layer 14 are preferably in direct contact with each other.

The light-absorbent coating layer 14 may be formed of the light-transmissible resin listed above to which the light-absorbent material is added or have a configuration in which a light-absorbent material is applied to the surface of the coating layer 14 which is in contact with the allochroic layer 11.

Suitable light-absorbent materials include a polyvalent metal hydroxide, an organic aluminum compound, salts such as nitrate, silicate, phosphate, oxalate, aluminum salt, and other salt, and a colorant material such as a cyanine colorant, a phthalocyanine colorant, a diimmonium colorant, an anthraquinone colorant, and an aluminum colorant.

An amount of the light-absorbent material to be added to the light-transmissible resin may be determined depending on a wavelength of the laser beam applied to the coating layer 14, the light-transmissible resin, and the light-absorbent material. The amount to be added may be selected depending on an absorption efficiency relative to a laser beam energy, the light transmittance of the coating layer 14, an influence on other layers of the anti-counterfeiting structure 10, and other factors. When the coating layer 14 is light-absorbent, the coating layer 14 is preferably 10 μm or more to 1000 μm or less thick.

When the coating layer 14 is configured to scatter the laser beam emitted onto it, the following effect can be achieved in a part where the allochroic layer 11 and the coating layer 14 are in contact with each other during laser irradiation for discoloring the allochroic layer 11 from the substrate 17 toward the allochroic layer 11.

In other words, the coating layer 14 reflects or scatters parts of the laser beam emitted onto the allochroic layer 11 that have passed through the coating layer 14 without being absorbed by the allochroic layer 11. At least a part of the light reflected or scattered by the coating layer 14 thus irradiates the allochroic layer 11 again. The allochroic layer 11 therefore absorbs the laser beam more efficiently.

When the coating layer 14 is light-reflective, the coating layer 14 is formed of a multilayer film and a metal oxide film configured to selectively reflect light with the wavelength of the laser beam emitted to the coating layer 14.

Among these films, the multilayer film consists of a plurality of layers selected from a metal layer formed of a metal and a dielectric layer.

When the multilayer film consists of at least one of the metal layer and a low molecular dielectric layer, the multilayer film can be formed on one surface of the base material 17 by a vapor deposition method, a sputtering method, and other methods. When the multilayer film consists of a polymeric dielectric layer, the multilayer film formed into a film shape can be bonded to the base material 17.

The light-reflective coating layer 14 is preferably 5 nm or more to 1000 nm or less thick.

When a laser that irradiates the anti-counterfeiting structure 10 is an infrared laser, the coating layer 14 is preferably formed of indium oxide that is highly reflective to infrared light. In addition, the coating layer 14 may have a multilayer structure in which an indium oxide layer, a metal layer, and a metal oxide layer are stacked, or may be a titanium oxide layer having an oxygen-deficient anatase structure. The coating layer 14 is still highly reflective to infrared light even if it has such a configuration.

When the coating layer 14 has a light-scattering property, the coating layer 14 may have a configuration in which a surface in contact with the allochroic layer 11 is made rougher. Alternatively, the coating layer 14 may have a configuration in which a material that reflects light with a wavelength of a laser beam emitted to the anti-counterfeiting structure 10 is dispersed in the light-transmissible resins listed above. Examples of the light-reflective material include a crushed piece of material for the light-reflective coating layer 14 and a particle whose refractive index to light in a wavelength range of the laser beam is different from that of a light-transmissible resin.

The refractive index to light in the wavelength range of the laser beam is preferably different by 0.3 or more between the light-transmissible resin and the particle.

[Laser Irradiation]

The personal information 11b recorded in the anti-counterfeiting structure 10 by laser irradiation may include at least one of biological information and non-biological information.

The biometric information is a characteristic unique to an individual, a characteristic authenticated among biometric features.

The information typically includes an image or pattern of a face, a fingerprint, and a vein pattern. The non-biometric information is personal information other than the biometric information. The non-biometric personal information typically includes one's name, date of birth, age, blood type, sex, nationality, address, domicile, telephone number, department name, and job title.

The laser 20 described above is a far-infrared laser including a CO2 laser, a near-infrared pulse laser including an Nd:YAG laser and an Nd:YVO laser, a pulsed laser of visible light, an excimer laser, etc. The laser 20 may also be an ultraviolet laser by use of a third harmonic of an Nd:YAG laser or an Nd:YVO laser, a semiconductor laser, a femtosecond laser, a picosecond laser, etc.

Among these lasers, the laser by use of the third harmonic of the Nd:YAG laser or the Nd:YVO laser is preferable in that it has high resolution and that the allochroic layer 11 is highly absorbent to a laser beam because the wavelength of the laser beam is included in the ultraviolet range.

In addition, a ultrashort pulse laser such as a femtosecond laser and a picosecond laser can cut molecular bonds constituting the allochroic layer 11 in a state in which the laser-irradiated allochroic layer 11 remains cool. This makes it possible to record visible information on the allochroic layer 11 in a state in which substantially no heat is applied to the allochroic layer 11.

Compared with other lasers, in addition, YAG lasers and semiconductor lasers are preferable in being capable of serving as a small device that emits a large amount of thermal energy, and in being capable of recording visible information on the allochroic layer 11 on demand.

EXAMPLES

Example 1

A 25-μm-thick transparent polyethylene terephthalate (PET) film was prepared as a support layer for the transfer foil. Then an ink for a foamable member with the following composition was applied onto one side of the support layer to form a coating film. The coating film was then dried at 120° C. for 45 seconds to form a foamable member having a thickness of 1 μm.

An ink for a foam-promoting portion with the following composition was subsequently printed on a surface of the foamable member opposite to a surface in contact with the support layer by a screen printing method. At that time, as a promoting member constituting the foam-promoting portion, in a plan view of the supporting layer, a foam-promoting portion showing numeral "1", a foam-promoting portion representing a numeral "2", and a foam-promoting portion representing a numeral "3" were formed so that these parts would have a thickness of 5 μm after being dried.

A coating film was formed by application of an ink for an intermediate layer, an ink with the following composition, such that the coating film covers a part where the foam-promoting portion was not located, a part being present on a surface of the foaming part where the foam-promoting portion was located, and the foam-promoting portion. Then the coating film was dried at 120° C. for 45 seconds to form an intermediate layer having a thickness of 5 μm. Note that the thickness of the intermediate layer is defined as a distance between a surface opposite to the surface in contact with the foamable member in the foam-promoting portion and a surface of the intermediate layer opposite to the foaming part relative to the foam-promoting portion.

An ink for a forming part with the following composition was applied onto the surface of the intermediate layer opposite to the surface in contact with the foamable member. The coating film was then dried at 120° C. for 45 seconds and was 3 μm thick. A surface opposite to the surface in contact with the intermediate layer of the dried coating film was irradiated with ultraviolet rays while a press plate was pressed by a roll embossing method thereagainst. A formed part with a relief surface having a fine uneven pattern was thus formed on the surface opposite to the surface in contact with the intermediate layer.

A 1000-Å-thick zinc sulfide film was subsequently formed as a light-reflective amplifying part on the relief surface of the formed part by a vacuum evaporation method. An ink for an adhesive layer with the following composition was applied onto a surface of the amplifying part opposite to a surface in contact with the formed part to form a coating film that serves as an adhesive layer that would be 2 μm thick after the coating film was dried. Thus, the transfer foil for forming the anti-counterfeiting structure of Example 1 was produced.

[Ink for Foamable Member]
Polyamide-imide resin . . . 40 parts
Dimethylacetamide . . . 30 parts
Tetrahydrofuran . . . 30 parts
[Ink for Foam-Promoting Portion]
Pearl Pigment
(Iriodin 111 Rutile Fine Satin, manufactured by Merck Japan Ltd.) . . . 30 parts
(Iriodin is a registered trademark)
Screen ink medium . . . 70 parts
[Ink for Intermediate Layer]
Amorphous polyester resin . . . 80 parts
Silica Particle
(Sylysia 350 manufactured by Fuji Silycia Co., Ltd.) . . . 5 parts
(Sylysia is a registered trademark)
Toluene . . . 15 parts
[Ink for Forming Part]
UV curable acrylic resin . . . 80 parts
Silane coupling agent . . . 13 parts
Release agent . . . 7 parts
[Ink for Adhesive Layer]
Polyurethane resin . . . 30 parts
Methyl ethyl ketone . . . 70 parts After preparation of a 100-μm-thick allochroic layer (Makrofol ID4-4 laserable, manufactured by Bayer) (Makrofol is a registered trademark), a hot stamp whose plate surface temperature was 131° C. was pressed against the support layer with 1.2 t pressure with an adhesive layer of the transfer foil being in contact with one surface of the allochroic layer. Then changing a position of the transfer foil relative to the allochroic layer removed the support layer from a foamable member included in a part adhered to the allochroic layer of the transfer foil.

A 400-μm-thick base material and a 125-μm-thick coating layer (Makrofol ID 6-2_000000 manufactured by Bayer) were prepared. The base material, the allochroic layer, and the coating layer were then laminated under a condition of 190° C. and 100 kgf/cm$^2$ for 3 minutes by use of a hydraulic molding machine in a state in which the allochroic layer having a device structure transferred was sandwiched between the base material and the coating layer. The base material, the allochroic layer, and the coating layer were further laminated under a condition of 25° C. and 100 kgf/cm$^2$ for 3 minutes. The anti-counterfeiting structure of Example 1 was thus produced.

The anti-counterfeiting structure was laser-irradiated by use of a YVO4 laser (MD-V9600A manufactured by Keyence Corporation). At that time, the anti-counterfeiting structure was laser-irradiated from the coating layer toward the foamable layer, and laser-irradiated from the coating layer toward the allochroic layer. Thus a foamed part was formed in the laser-irradiated part on the foamable layer, and a discolored part was formed in the laser-irradiated part of the allochroic layer. Note that forming the discolored part in the allochroic layer ensured that the allochroic layer presented a facial image and personal information as visible information.

An attempt to remove the coating layer from the allochroic layer of the anti-counterfeiting structure to remove from the allochroic layer the device structure sandwiched between the allochroic layer and the coating layer produced a result that the foamed part formed in the foamable layer was crushed with the optical device and the foamable layer remaining bonded. In other words, it was recognized that a deformable part, where the foamed part was deformed from before the removal of the coating layer, was formed as a trace of the coating layer being removed.

As described above, one embodiment of the anti-counterfeiting structure can achieve the following effects.

(1) Removing the coating layer 14 from the anti-counterfeiting structure 10 leaves, on the device structure 10 including the optical device 13, a trace of the coating layer 14 being removed, which in turn makes it possible to prevent counterfeiting from being carried out by removal of the optical device 13 from the anti-counterfeiting structure 10.

(2) Foaming in a part of the foamable layer 12 and discoloration in a part overlapping with the part of the foamable layer 12 of the allochroic part in the plan view of the coating layer 14 can be carried out with a single occasion of laser irradiation.

(3) The anti-counterfeiting structure 10 can be laser-irradiated at lower energy because, compared with a configuration in which the foamable layer 12 is sandwiched between the optical device 13 and the coating layer 14, the optical device 13 consumes low laser beam energy during laser irradiation from the coating layer 14 toward the foamable layer 12.

(4) Selectively foaming in a part of the foamable member 12a, a part that overlaps with the foam-promoting portion 12b, can be made possible.

(5) The surface in contact with the optical device 13 can be made flatter because the anti-counterfeiting structure 10 has the intermediate layer 15. This prevents the optical characteristic of the optical device 13 from varying in a plane parallel to the coating layer 14.

(6) When the side opposite to the allochroic layer 11 relative to the coating layer 14 is an observation side of the anti-counterfeiting structure 10, visible information formed by the plurality of promotion parts 12b1 is recognized by an observer. The anti-counterfeiting structure 10 can thus contain visible information represented by the allochroic part of the allochroic layer 11 and visible information represented by the foamed part of the cover layer 14.

Note that the embodiment described above can also be implemented by the appropriate modifications described below.

The anti-counterfeiting structure 10 may include an information-containing layer that contains visible information formed by a method other than laser irradiation, instead of by the allochroic layer 11 having an allochroic part that discolors in response to laser irradiation. The information-containing layer may be a layer in which visible information is recorded by an ink jet method, or may be a layer in which visible information is recorded by a printing method such as a screen printing method. Such a configuration can achieve an effect similar to the above (1).

Part of the coating layer 14 that constitutes an outer surface of the anti-counterfeiting structure 10 may be flat to a degree substantially identical to that before the foamed part 14a is formed, after the foamed part 14a is formed. Even with such a configuration, the coating layer 14 can still present visible information formed by the foamed part 14a as long as the coating layer 14 is configured such that the part thereof where the foamed part 14a is formed and the part thereof where the foamed part 14a is not formed are visually recognized distinctively by an observer.

The coating layer 14 may be configured not to foam in response to laser irradiation even in the part overlapping with the foam-promoting portion 12b in the plan view of the coating layer 14. Even with such configuration, visible information represented by the foamed part 12d is visually recognized by the observer as long as the coating layer 14 is transmissible enough to show the foamed part 12d formed in the foamable member 12a toward an observation side.

The anti-counterfeiting structure 10 may not have the intermediate layer 15. Even with such configuration, the optical device 13 may be formed in contact with the foamable layer 12 to have a predetermined function as an optical device.

One foam-promoting portion 12b may be provided for each anti-counterfeiting structure 10.

With such a configuration, the anti-counterfeiting structure 10 may or may not include the intermediate layer 15. When one foam-promoting portion 12b is formed to overlap with a part of the foamable member 12a in the plan view of the coating layer 14, the anti-counterfeiting structure 10 preferably includes the intermediate layer 15 covering the foam-promoting portion 12b. As long as one foam-promoting portion 12b is formed to overlap with a whole of the foamable member 12a in the plan view of the coating layer 14, a surface in contact with the foam-promoting portion 12b can be substantially flattened in the optical device 13 even in a circumstance where the anti-counterfeiting structure 10 does not include the intermediate layer 15.

In the foamable layer 12, the foamable member 12a and the foam-promoting portion 12b may be integrally formed. In other words, the foamable layer 12 may be formed of a mixture of a material acting as the foamable member 12a and a material acting as the foam-promoting portion 12b. Alternatively, the foamable layer 12 may be formed of a single material having a characteristic of changing from an unfoamed state to a foamed state in response to laser irradiation.

In the anti-counterfeiting structure 10, the first layer may be the optical device 13 and the second layer may be the foamable layer 12. Such a configuration can still achieve an effect similar to the above (1).

An allochroic part of the allochroic layer 11 may be a part including a part overlapping with the foamable layer 12 in a plan view of the coating layer 14. Alternatively, an allochroic part of the allochroic layer 11 may be a part overlapping with the foamable layer 12 in a plan view of the coating layer 14.

In a configuration in which the foamable layer 12 overlaps with a part of the coating layer 14 and the allochroic part of the allochroic layer 11 overlaps with a part of the coating layer 14 in the plan view of the coating layer 14, the coating layer 14 and the allochroic part may not overlap with each other in the plan view of the coating layer 14. Such a configuration can still achieve an effect similar to the above (1). As described above, the coating layer 14 may be configured to cover at least the first layer of the structure constituted by the allochroic layer, the first layer, and the second layer. In the configuration in which the foamable layer 12 is the first layer, the coating layer 14 may be configured to cover only the foamable layer 12. In a configuration in which the optical device 13 is the first layer, the coating layer 14 may be configured to cover only the optical device 13. In addition, in a configuration in which the allochroic layer 11, the foamable layer 12, and the optical device 13 each have a part that is exposed to the coating layer 14 in the plan view of the coating layer 14, the coating layer 14 may be configured to cover these exposed parts for the allochroic layer 11, the foamable layer 12, and the optical device 13.

The optical device 13 is not limited to the OVD described above, but may be another optical device. The optical device 13 may also be a device that reflects light incident on the optical device 13, a device that emits light incident on the optical device 13 as scattered light, a device that emits light incident on the optical device 13 after converting its color into a different color, and a device that prevents light incident on the optical device 13 from being reflected.

The anti-counterfeiting structure 10 may not necessarily include the base material 17 in a circumstance where the allochroic layer 11 can support the device structure 10D while the anti-counterfeiting structure 10 is in use, or where the device structure 10D can be supported by a member other than the anti-counterfeiting structure 10.

The anti-counterfeiting structure 10 may not include the adhesive layer 16 in a circumstance where the anti-counterfeiting structure 10 can keep a structure including at least the foamable layer 12 and the optical device 13 positioned between the allochroic layer 11 and the coating layer 14.

A bond between the coating layer 14 and the foamable layer 12 does not include only a direct bond but also an indirect bond therebetween as in a configuration in which another layer such as an adhesive layer is interposed therebetween. In a configuration in which at least a part of the foamable layer 12 is located between the allochroic layer 11 and the optical device 13, the bond between the coating layer 14 and the optical device 13 does not include only a direct bond but also an indirect bond therebetween as in a configuration in which another layer such as an adhesive layer, is interposed therebetween.

Figure 13:
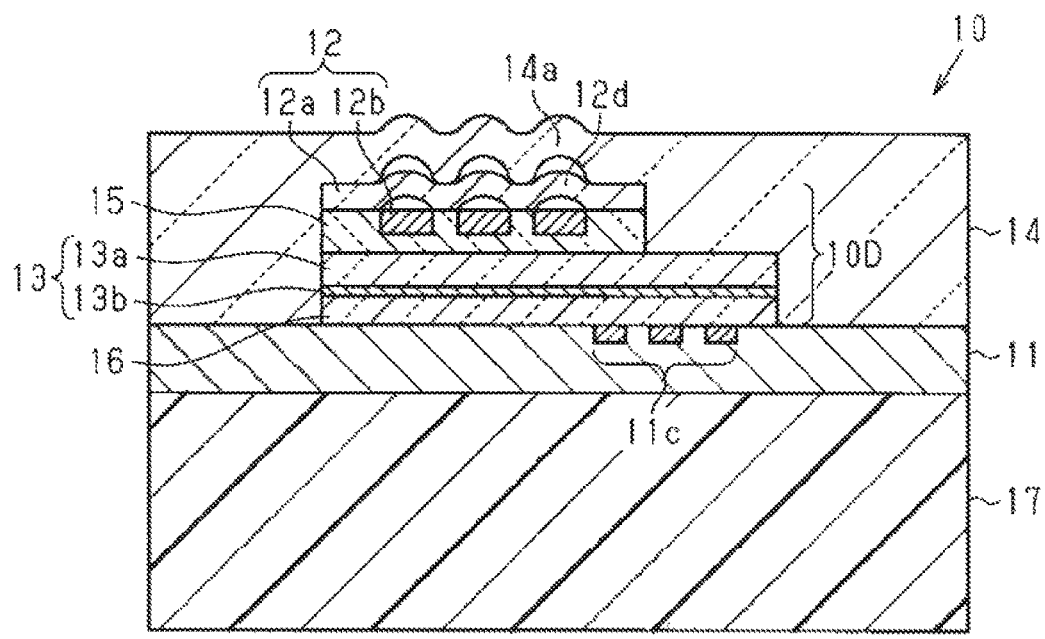
FIG. 13 is a cross-sectional view of an anti-counterfeiting structure according to a modification.

As shown in FIG. 13, the device structure 10D has a part constituted only by the optical device 13 and the adhesive layer 16. The part may overlap with the discolored part 11c in the plan view of the coating layer 14. Such a configuration can still achieve an effect similar to the above (1) because the foamable layer 12 and the optical device 13 still overlap with each other in the plan view of the coating layer 14 in a part of the device structure 10D.

Forming a part constituted by the optical device 13 and the adhesive layer 16 and a part constituted by the foamable layer 12 and the intermediate layer 15 of the device structure 10D separately, incidentally, can form the device structure 10D shown in FIG. 13.

Figure 14:
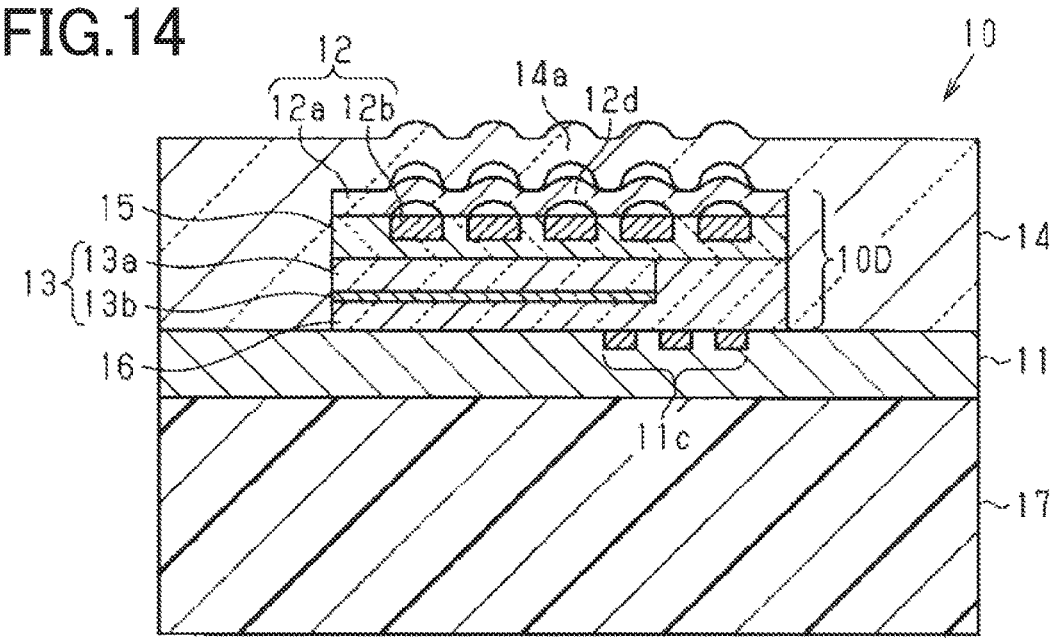
FIG. 14 is a cross-sectional view of an anti-counterfeiting structure according to a modification.

As shown in FIG. 14, the device structure 10D has a part constituted only by the foaming layer 12, the intermediate layer 15, and the adhesive layer 16. The part may overlap with the discolored part 11c in the plan view of the coating layer 14. Such a configuration can still achieve an effect similar to the above (1) because the foamable layer 12 and the optical device 13 still overlap with each other in the plan view of the coating layer 14 in a part of the device structure 10D.

Note that such a device structure 10D can be formed on the allochroic layer 11 by use of the following transfer foil. In other words, a plurality of optical devices 13 overlapping with a part of the intermediate layer 15 is formed in a transfer foil with the support layer 31, the foamable layer 12, the intermediate layer 15, the optical device 13, and the adhesive layer 16, as in the transfer foil described earlier with reference to FIG. 10. Then the adhesive layer 16 is formed so as to fill a gap between the mutually adjacent optical devices 13.

Transferring, to the allochroic layer 11, a part of the transfer foil that includes the optical device 13 and a part of the transfer foil that does not include the optical device 13 can form the device structure 10D shown in FIG. 14.

What is claimed is:

1. An anti-counterfeiting structure, comprising:
   an allochroic layer including an allochroic part having a characteristic of changing from a first material to a second material in response to laser irradiation;
   a first layer transmissible to a laser beam;
   a second layer transmissible to a laser beam, at least a part of the second layer being located between the allochroic layer and the first layer; and
   a coating layer transmissible to a laser beam and covering at least the first layer,
   wherein the coating layer and the first layer are bonded together more weakly than the first layer and the second layer are,
   wherein one of the first layer and the second layer is a foamable layer having a characteristic of changing from an unfoamed state to a foamed state in response to laser irradiation,
   wherein the other of the first layer and the second layer is an optical device, and
   wherein the foamable layer includes:
      a foamable member; and
      a foam-promoting portion having a part overlapping with a part of the foamable member in a plan view of the coating layer and having a characteristic of promoting foaming in the part of the foamable member by laser irradiation.

2. The anti-counterfeiting structure of claim 1, wherein the foamable layer includes a part overlapping with the allochroic part in a plan view of the coating layer.

3. The anti-counterfeiting structure of claim 1, wherein the first layer is the foamable layer, and the second layer is the optical device.

4. The anti-counterfeiting structure of claim 1:
   wherein the foam-promoting portion is constituted by a plurality of promoting members, each promoting member being located between the optical device and the foamable member; and
   wherein the promoting members are located apart from each other in a plan view of the coating layer; and,
   further comprising an intermediate layer that is located between the optical device and the foam-promoting portion and that fills a gap between the promoting members in a plan view of the coating layer.

5. The anti-counterfeiting structure of claim 4, wherein, in the plan view of the coating layer, the promoting members are located on the allochroic layer to represent predetermined visible information, and a part of the coating layer overlapping with the promoting members is configured to have a characteristic of changing from an unfoamed state to a foamed state in response to laser irradiation of the promoting members.

6. An anti-counterfeiting structure, comprising:
an information-containing layer containing visible information;
a first layer transmissible to a laser beam;
a second layer transmissible to a laser beam, at least a part of the second layer being located between the information-containing layer and the first layer; and
a coating layer transmissible to a laser beam and covering at least the first layer,
wherein the coating layer and the first layer are bonded together more weakly than the first layer and the second layer are,
wherein one of the first layer and the second layer is a foamable layer having a characteristic of changing from a pre-foamed state to a foamed state in response to laser irradiation,
wherein the other of the first layer and the second layer is an optical device, and
wherein the foamable layer includes:
 a foamable member; and
 a foam-promoting portion having a part overlapping with a part of the foamable member in a plan view of the coating layer and having a characteristic of promoting foaming in the part of the foamable member by laser irradiation.

7. The anti-counterfeiting structure of claim 6:
wherein the foam-promoting portion is constituted by a plurality of promoting members, each promoting member being located between the optical device and the foamable member; and
wherein the promoting members are located apart from each other in a plan view of the coating layer; and,
further comprising an intermediate layer that is located between the optical device and the foam-promoting portion and that fills a gap between the promoting members in a plan view of the coating layer.

8. The anti-counterfeiting structure of claim 7, wherein, in the plan view of the coating layer, the promoting members are located on the allochroic layer to represent predetermined visible information, and a part of the coating layer overlapping with the promoting members is configured to have a characteristic of changing from an unfoamed state to a foamed state in response to laser irradiation of the promoting members.

9. An anti-counterfeiting structure, comprising:
an information-containing layer containing visible information;
a first layer transmissible to a laser beam;
a second layer transmissible to a laser beam, at least a part of the second layer being located between the information-containing layer and the first layer; and
a coating layer transmissible to a laser beam and covering at least the first layer,
wherein the coating layer and the first layer are bonded together more weakly than the first layer and the second layer are,
wherein one of the first layer and the second layer is a foamable layer having a characteristic of changing from an unfoamed state to a foamed state in response to laser irradiation and including a foamed part,
wherein the other of the first layer and the second layer is an optical device, and
wherein the foamable layer includes:
 a foamable member; and
 a foam-promoting portion having a part overlapping with a part of the foamable member in a plan view of the coating layer and having a characteristic of promoting foaming in the part of the foamable member by laser irradiation.

10. The anti-counterfeiting structure of claim 9:
wherein the foam-promoting portion is constituted by a plurality of promoting members, each promoting member being located between the optical device and the foamable member; and
wherein the promoting members are located apart from each other in a plan view of the coating layer; and,
further comprising an intermediate layer that is located between the optical device and the foam-promoting portion and that fills a gap between the promoting members in a plan view of the coating layer.

11. The anti-counterfeiting structure of claim 10, wherein, in the plan view of the coating layer, the promoting members are located on the allochroic layer to represent predetermined visible information, and a part of the coating layer overlapping with the promoting members is configured to have a characteristic of changing from an unfoamed state to a foamed state in response to laser irradiation of the promoting members.

* * * * *